Sept. 5, 1939.   J. W. BRYCE   2,172,330
SELECTIVE FILM PRINTER
Filed Jan. 21, 1937   23 Sheets-Sheet 1

INVENTOR
James W. Bryce
BY
Cooper, Kerr & Dunham
ATTORNEYS

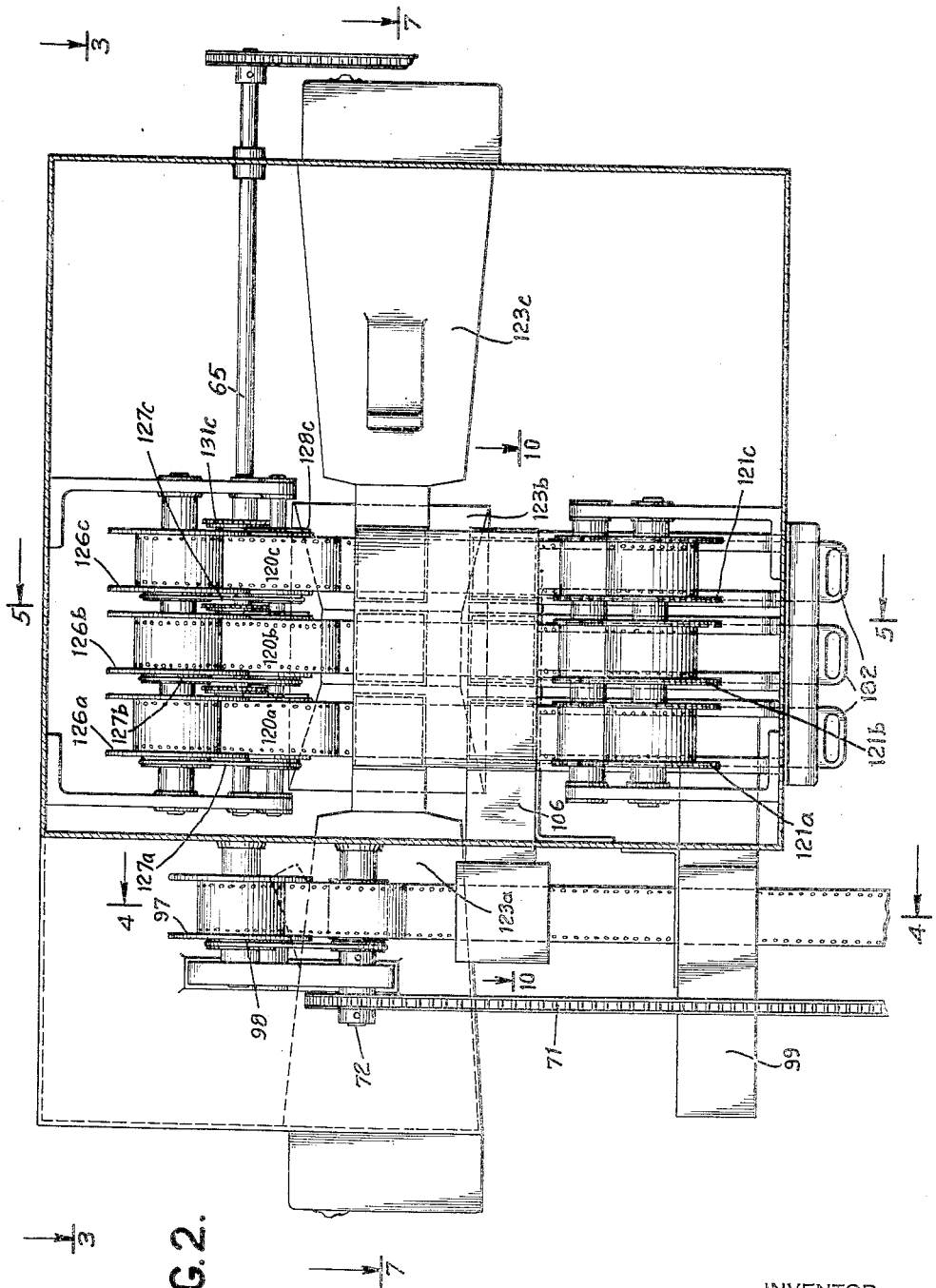

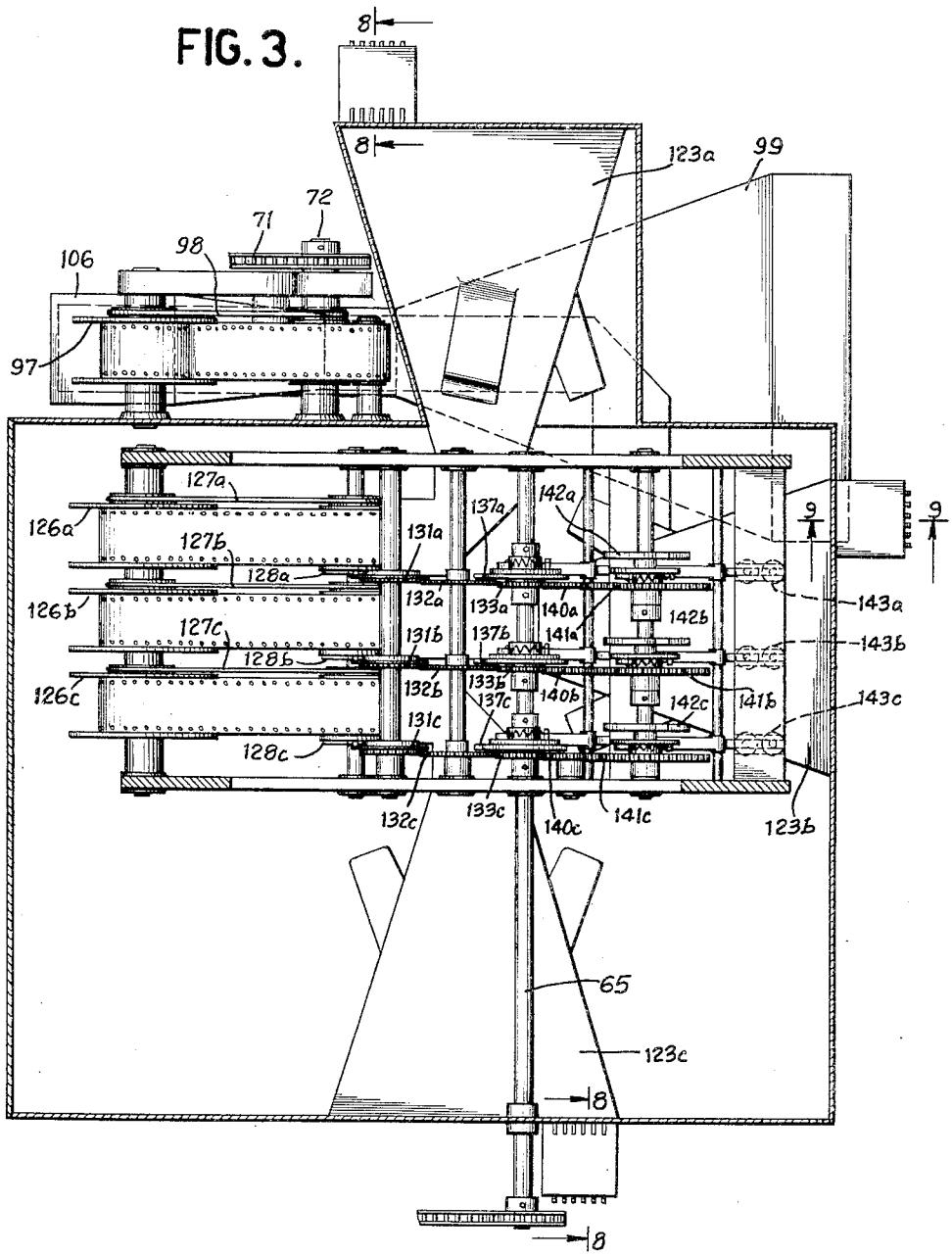

Sept. 5, 1939.　　　　J. W. BRYCE　　　　2,172,330
SELECTIVE FILM PRINTER
Filed Jan. 21, 1937　　　　23 Sheets-Sheet 4

INVENTOR
James W. Bryce
BY
Cooper, Kerr & Dunham
ATTORNEYS

Sept. 5, 1939.　　　　　J. W. BRYCE　　　　　2,172,330
SELECTIVE FILM PRINTER
Filed Jan. 21, 1937　　　23 Sheets-Sheet 5
FIG.5.
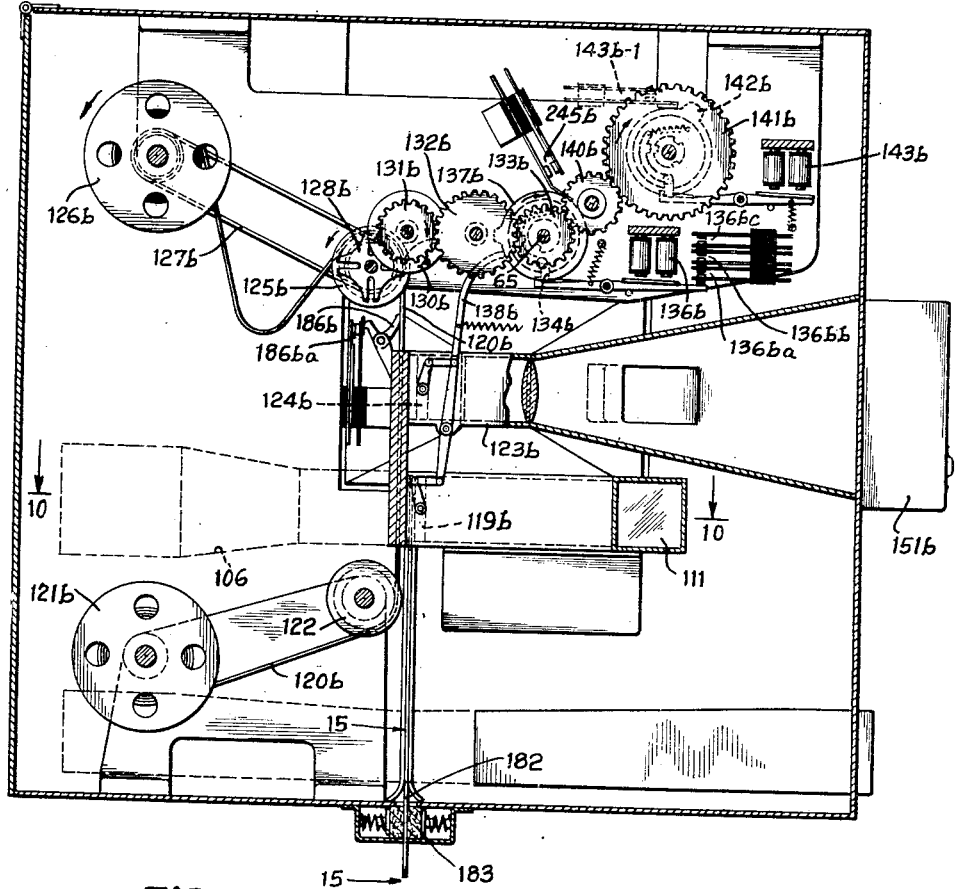
FIG.29.
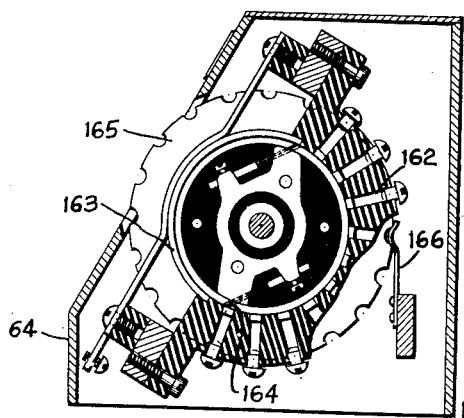
FIG.6.
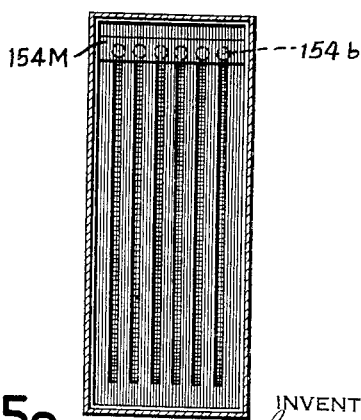
FIG.5a.
INVENTOR
James W. Bryce
BY
Cooper, Kerr & Dunham
ATTORNEYS Sept. 5, 1939.　　　J. W. BRYCE　　　2,172,330
SELECTIVE FILM PRINTER
Filed Jan. 21, 1937　　　23 Sheets-Sheet 6
FIG.7.
FIG.8.
FIG.9.
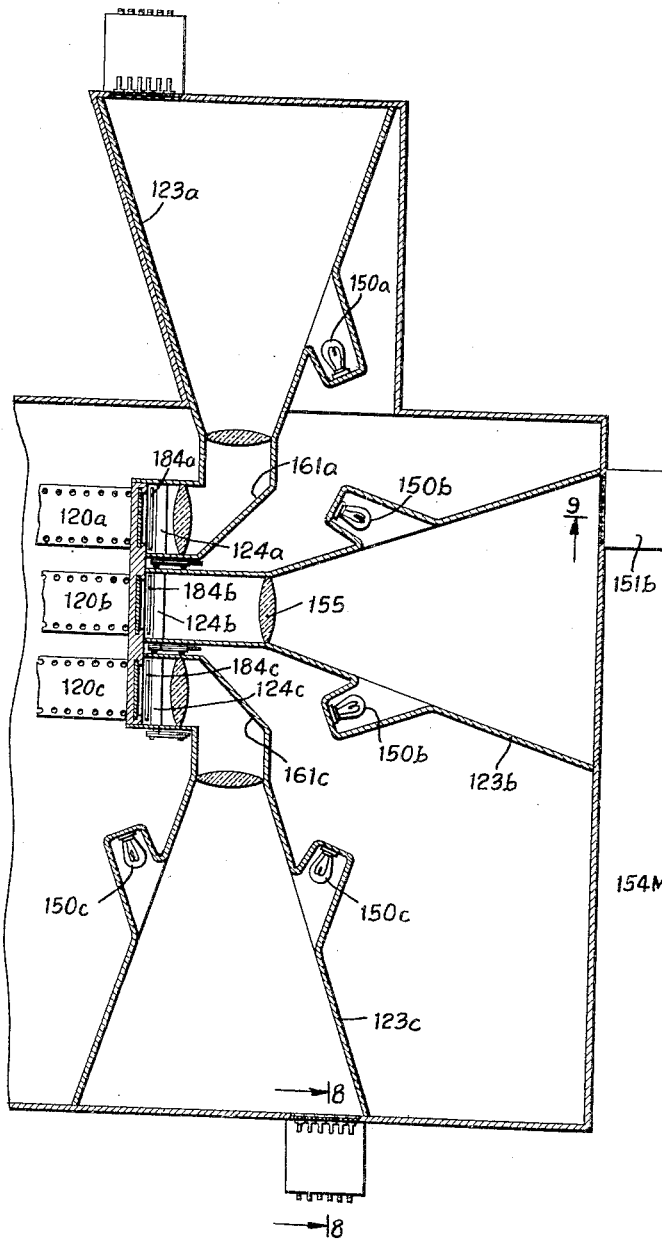
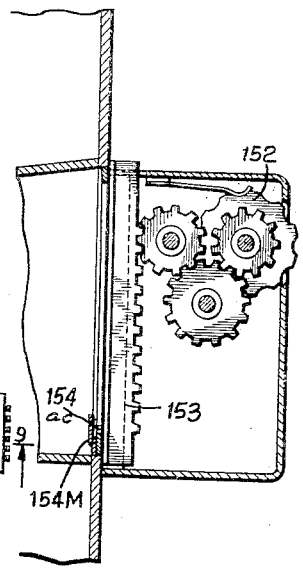
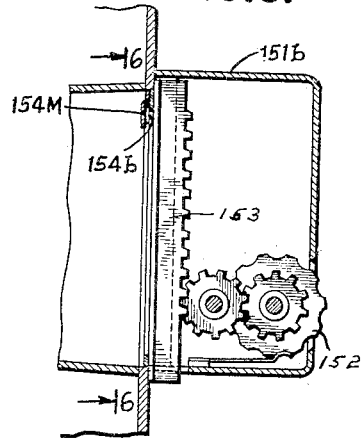
INVENTOR
James W. Bryce
BY
Cooper, Kerr & Dunham
ATTORNEYS Sept. 5, 1939.  J. W. BRYCE  2,172,330
SELECTIVE FILM PRINTER
Filed Jan. 21, 1937   23 Sheets-Sheet 7

INVENTOR
James W. Bryce
BY
Cooper, Kerr & Dunham
ATTORNEYS

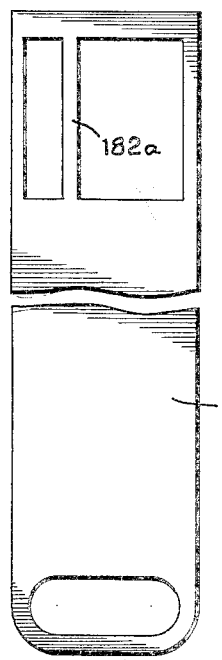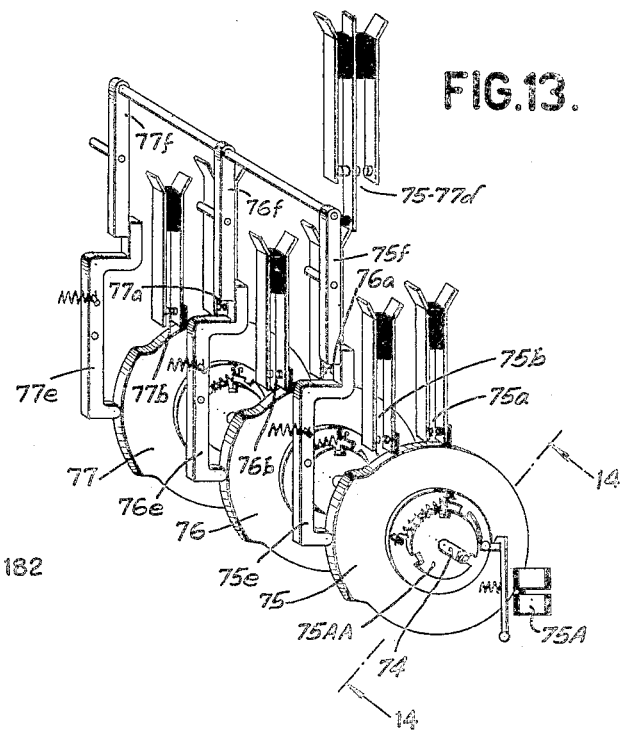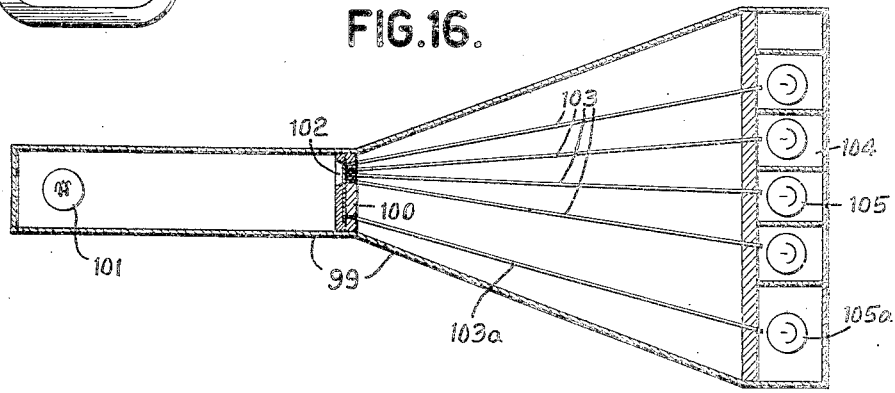

Sept. 5, 1939.  J. W. BRYCE  2,172,330
SELECTIVE FILM PRINTER
Filed Jan. 21, 1937  23 Sheets-Sheet 9

INVENTOR
James W. Bryce
BY
Cooper, Kerr & Dunham
ATTORNEYS

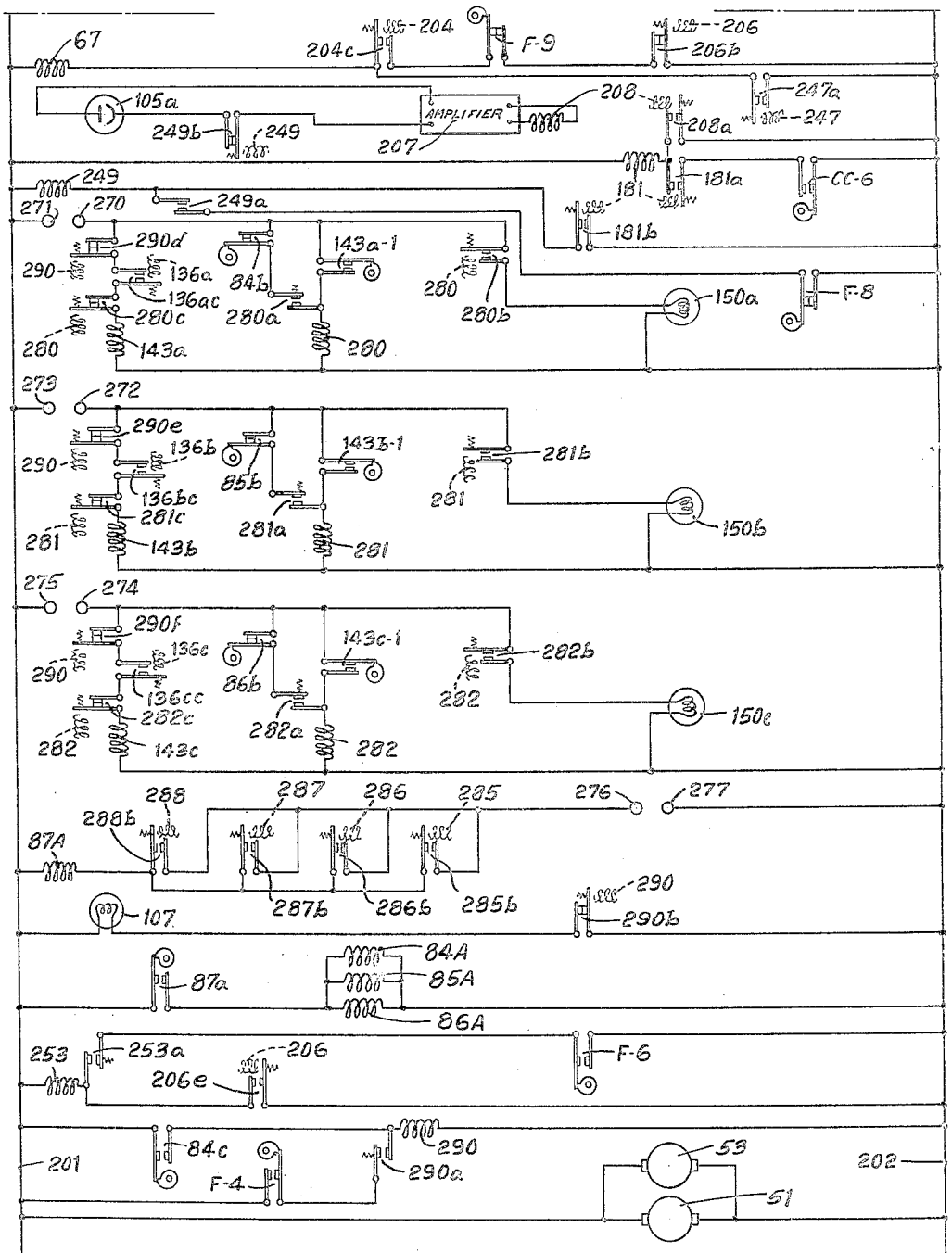
FIG.17c.

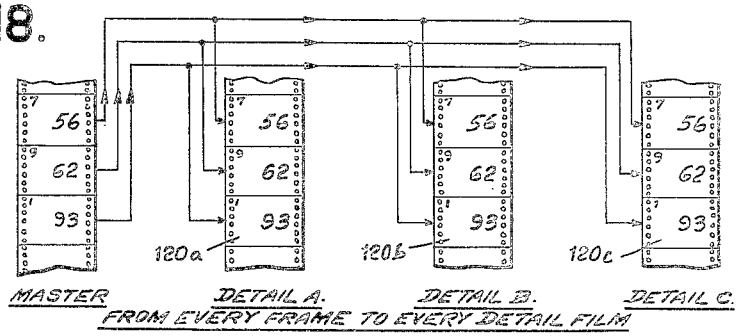
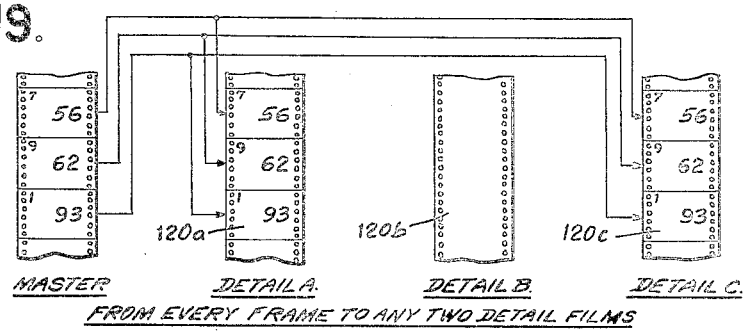
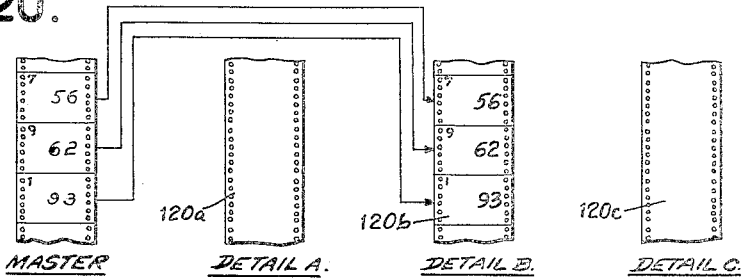
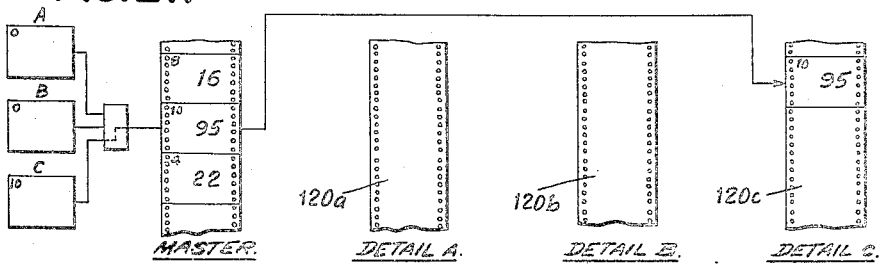

Sept. 5, 1939.    J. W. BRYCE    2,172,330
SELECTIVE FILM PRINTER
Filed Jan. 21, 1937    23 Sheets-Sheet 13

FIG.22.

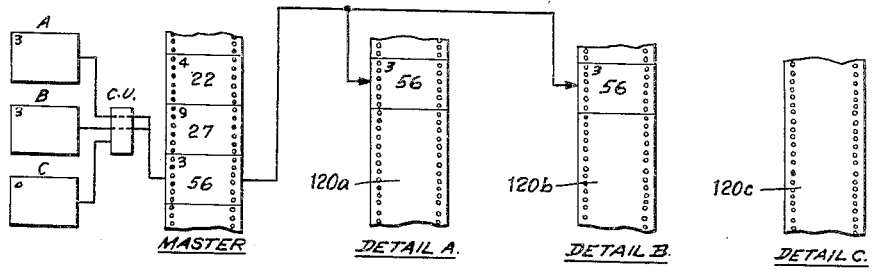

PRINT FROM A FRAME OF MASTER FILM ON MORE THAN ONE DETAIL FILM DUE TO COMPARISON OF MORE THAN ONE SETUP DEVICES.

FIG.23.

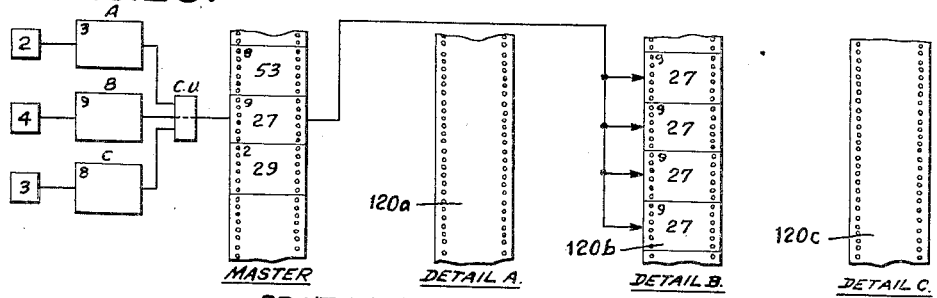

PRINT DATA FROM A FRAME OR MASTER FILM MORE THAN ONCE FOR A SINGLE COMPARISON.

FIG.24.

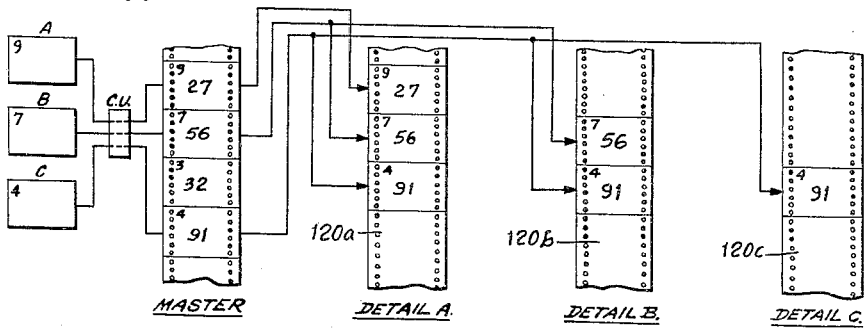

CAUSE PRINTING ON ONE OR MORE THAN ONE DETAIL FILM BY COMPARISON CONTROL BETWEEN FILM AND DATA ON ONE OR ANOTHER SINGLE SET UP DEVICE.

INVENTOR
James W. Bryce
BY
Cooper, Kerr & Dunham
ATTORNEYS

Sept. 5, 1939.  J. W. BRYCE  2,172,330
SELECTIVE FILM PRINTER
Filed Jan. 21, 1937  23 Sheets-Sheet 14

FIG. 25.

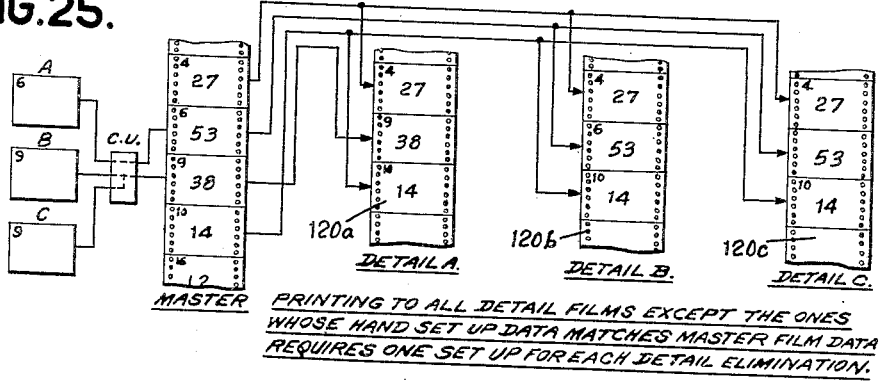

PRINTING TO ALL DETAIL FILMS EXCEPT THE ONES WHOSE HAND SET UP DATA MATCHES MASTER FILM DATA REQUIRES ONE SET UP FOR EACH DETAIL ELIMINATION.

FIG. 26.

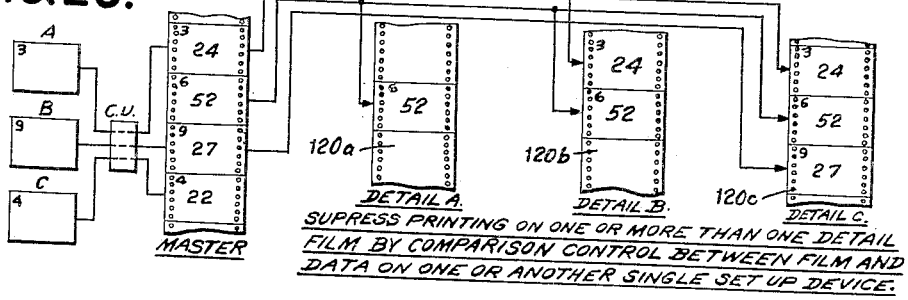

SUPRESS PRINTING ON ONE OR MORE THAN ONE DETAIL FILM BY COMPARISON CONTROL BETWEEN FILM AND DATA ON ONE OR ANOTHER SINGLE SET UP DEVICE.

FIG. 27.

ENTRY CONTROLLED BY ANY PREVIOUS METHOD. TYPE HERE SIMILAR TO C-6.

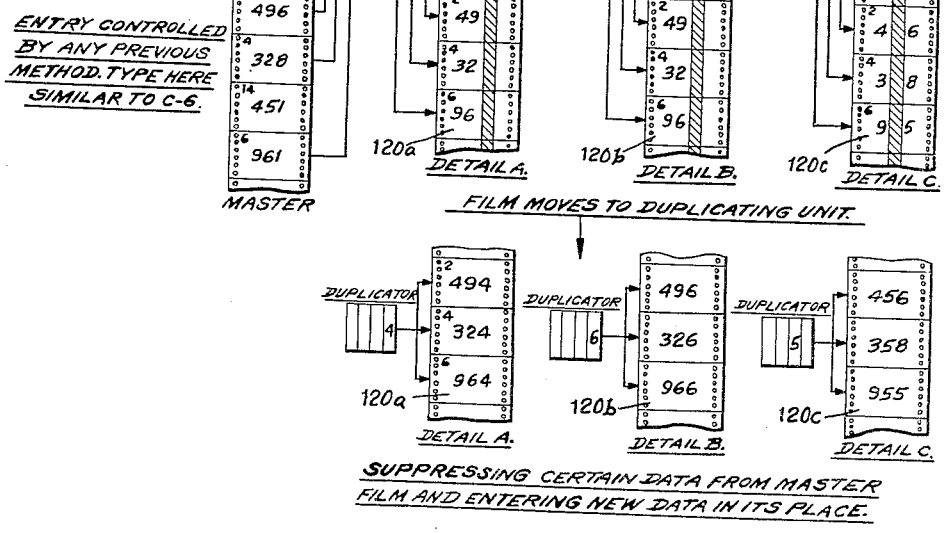

SUPPRESSING CERTAIN DATA FROM MASTER FILM AND ENTERING NEW DATA IN ITS PLACE.

INVENTOR
James W. Bryce
BY
Cooper, Kerr & Dunham
ATTORNEYS

Sept. 5, 1939. J. W. BRYCE 2,172,330
SELECTIVE FILM PRINTER
Filed Jan. 21, 1937 23 Sheets-Sheet 15

INVENTOR
James W. Bryce
BY
Cooper, Kerr & Dunham
ATTORNEYS

Sept. 5, 1939. J. W. BRYCE 2,172,330
SELECTIVE FILM PRINTER
Filed Jan. 21, 1937 23 Sheets-Sheet 16
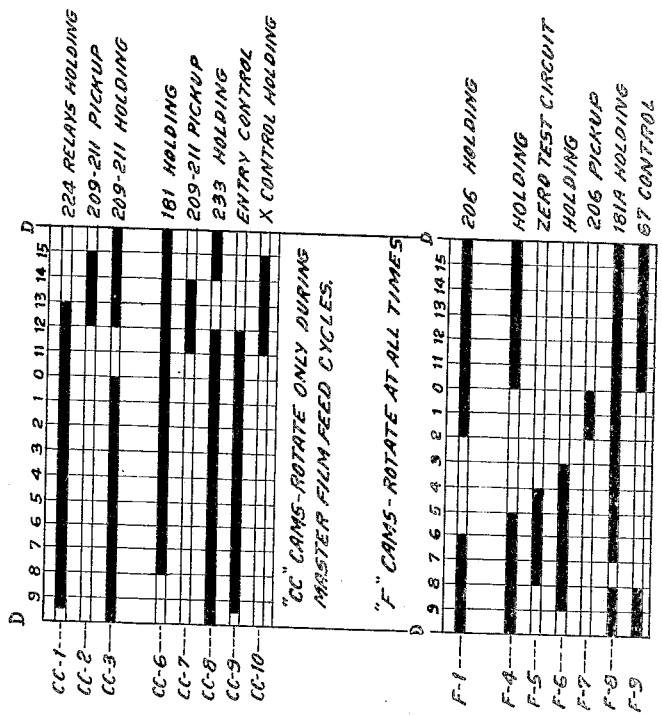
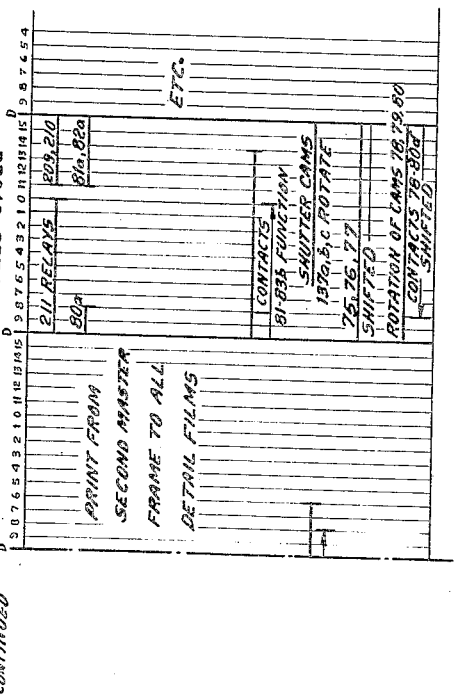
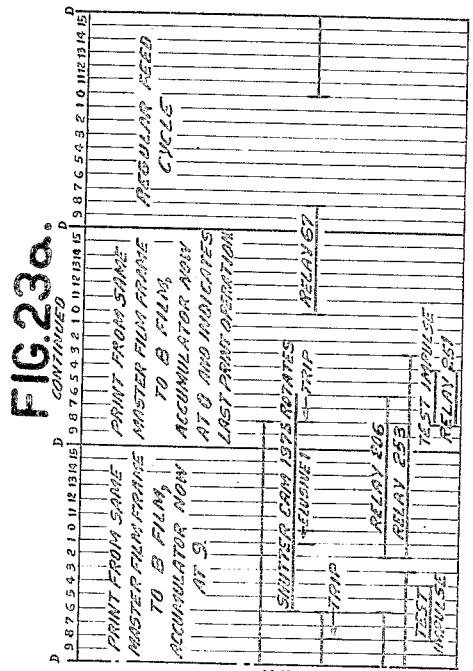

Sept. 5, 1939.  J. W. BRYCE  2,172,330
SELECTIVE FILM PRINTER
Filed Jan. 21, 1937   23 Sheets-Sheet 18

INVENTOR
James W. Bryce
BY
Cooper, Kerr & Dunham
ATTORNEYS

Sept. 5, 1939.                 J. W. BRYCE                     2,172,330
                          SELECTIVE FILM PRINTER
                    Filed Jan. 21, 1937        23 Sheets-Sheet 20

INVENTOR
James W. Bryce
BY
Cooper, Kerr & Dunham
ATTORNEYS

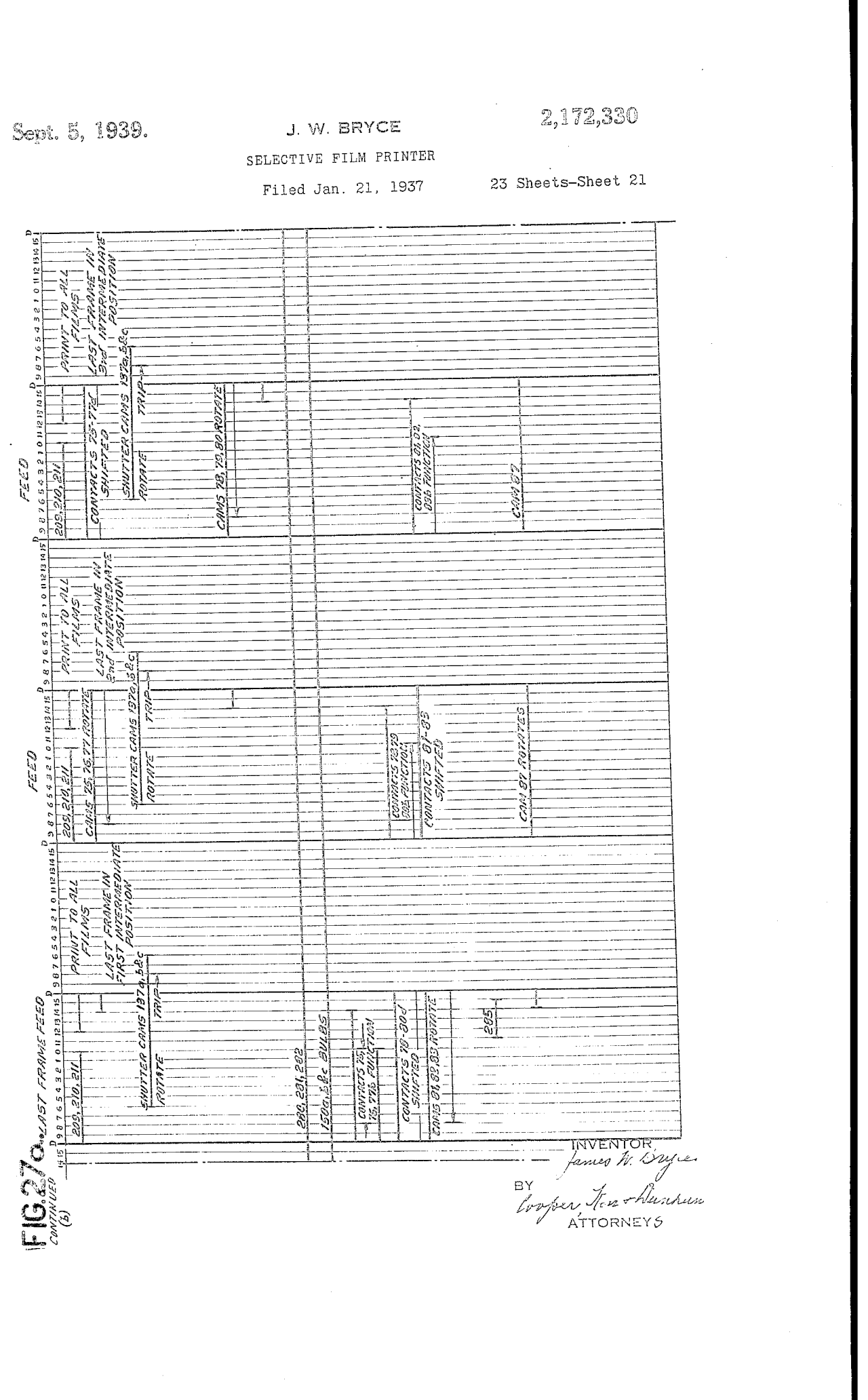

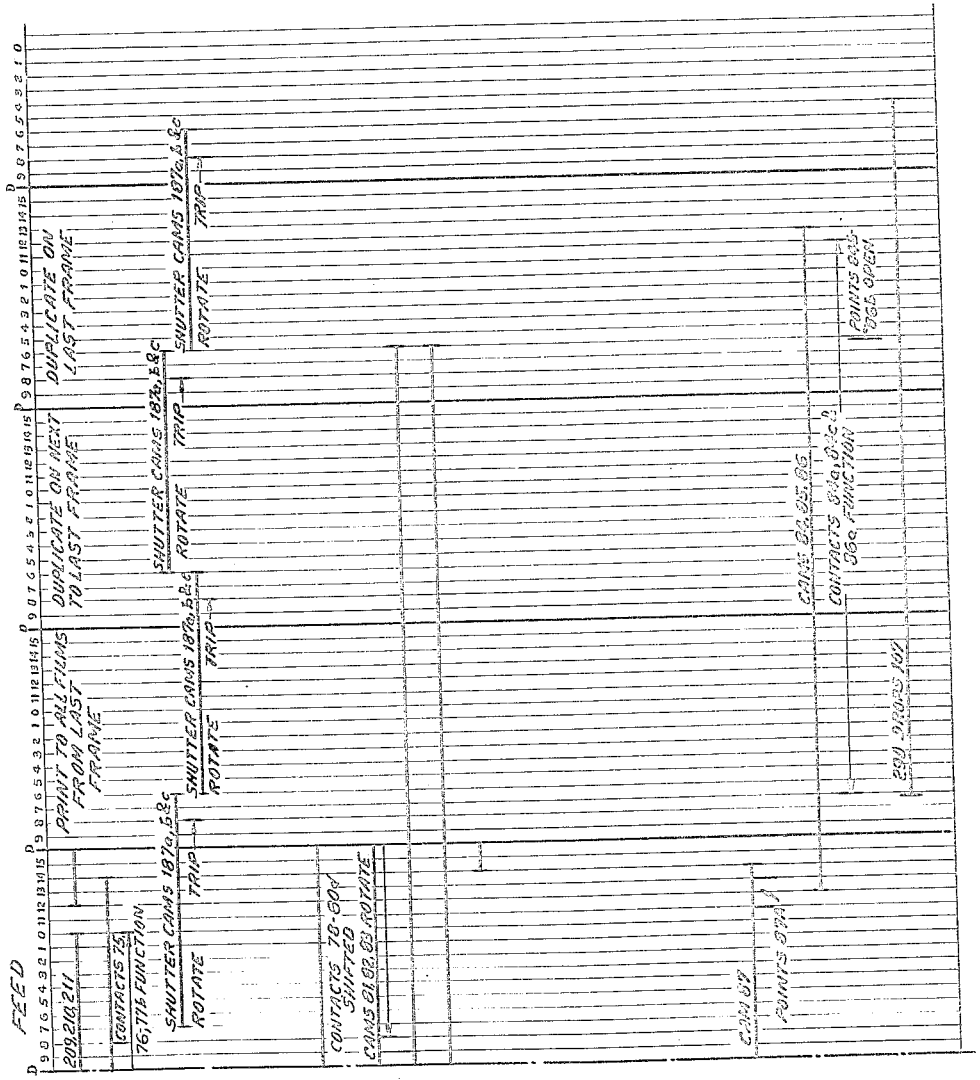

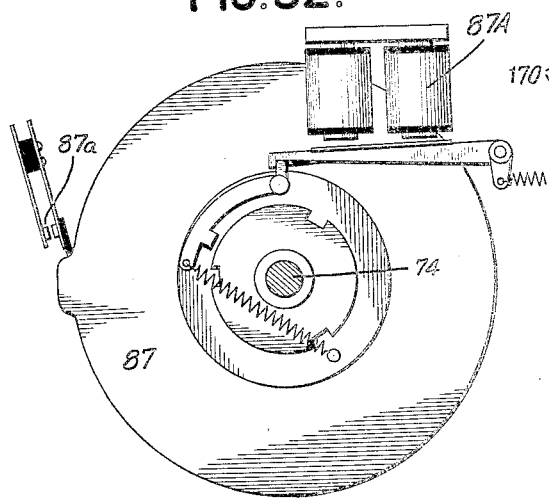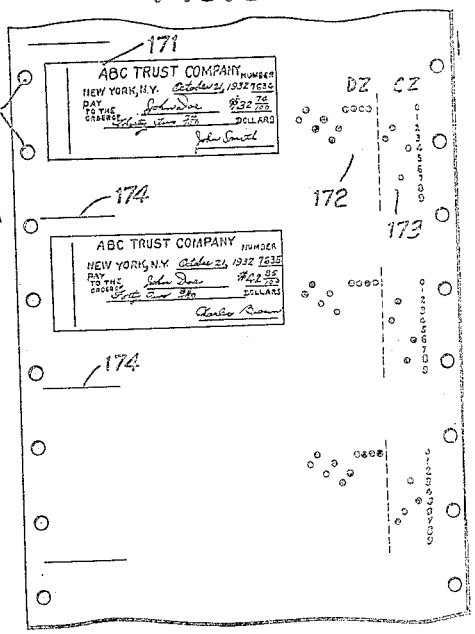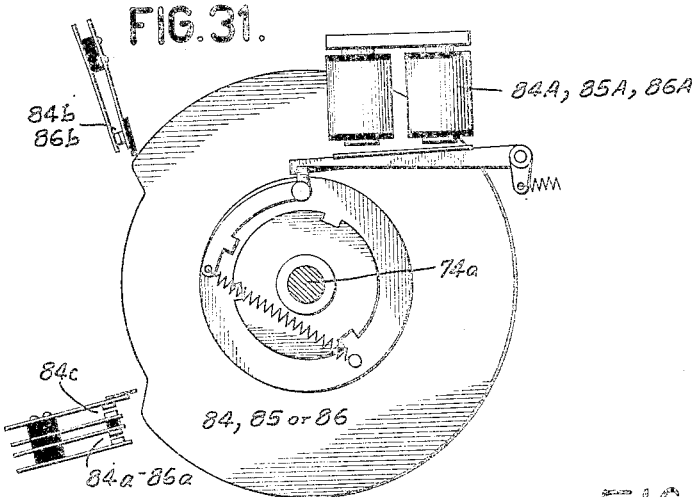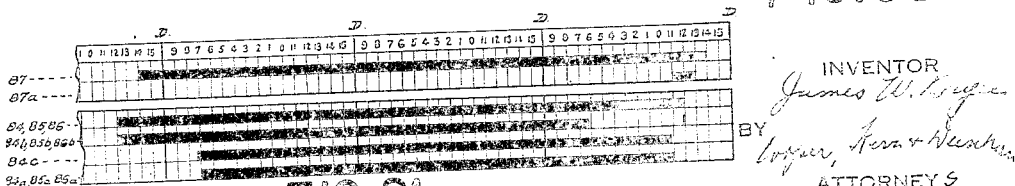

Patented Sept. 5, 1939

2,172,330

UNITED STATES PATENT OFFICE 2,172,330

SELECTIVE FILM PRINTER

James W. Bryce, Glen Ridge, N. J., assignor to International Business Machines Corporation, New York, N. Y., a corporation of New York Application January 21, 1937, Serial No. 121,472

27 Claims. (Cl. 88—24)

This invention relates to improvements in film printing machines and more particularly to improvements in machines adapted to derive data from a master film and imprint such data or selected portions thereof upon one or more detail films. In general the film printing machine is intended for use with films for statistical and accounting data and in general the machine comprises film feeding means for a master film, film feeding means for one or more detail films, means to optically sense data appearing on the master film and means to compare such optically sensed master film data with set up data which is set up in setup devices of the machine.

The machine also includes printing means for imprinting data derived in whole or in part from the master film on one or more detail films and control means are also provided for the detail film printing means to suppress or permit printing on a detail film or films depending upon lack of comparison of data derived from the master film with data in the setup devices of the machine.

The machine also includes means to selectively suppress and block off the printing of certain data from the master film on one or more of the detail films and blocking off may be effected in selected variable zones on each and every detail film.

The machine also includes a so-called duplicating unit whereby hand set up data may, if desired, be imprinted on the detail films. Control means are provided to permit repetition printing of data derived in whole or in part from the master film upon successive frames of one or more of the detail films. Provision is also made whereby data derived from every frame of the master film may be imprinted upon each and every of the detail films. Likewise provision is made whereby data derived from a common frame of the master film may be imprinted on two of the detail films and printing of such data suppressed upon another detail film.

As a variation of the foregoing, provision is made whereby data derived from successive frames of a master film may be imprinted upon successive frames of a detail film and printing suppressed on other detail films.

Another object of the present invention resides in the provision of a construction wherein upon a comparison of data set up in the machine with data derived from the frame of a master film, printing may be effected on a particular or corresponding detail film.

Another object of the present invention resides in the provision of a machine of such construction that printing may be effected from a frame of a master film on one or more detail films, the printing being permitted due to a comparison of data derived from the master film with data on one or more setup devices.

A further object of the present invention resides in the provision of a machine of such construction whereby data derived from a single frame of a master film may be printed a selected number of times upon a detail film under a comparison control.

A further object of the present invention resides in the provision of a machine to provide for repetition printing on a detail film of data derived from a single frame of a master film, with such repetition printing being effected a selected number of times with control of such printing provided for by a comparison control and a number of times control.

A further object of the present invention resides in the provision of a film printing machine with means to cause printing on one or more than one detail film under a comparison control between master film data and data on one or another single setup device.

A further object of the present invention resides in the provision of a construction wherein printing of data derived in whole or in part from the master film may be effected on all detail films except the ones where hand set up data matches the master film data.

A further object of the present invention resides in the provision of a construction with control means whereby printing may be suppressed on one, a plurality or all detail films when data derived from the master film compares with data set up on a comparison device.

A further object of the present invention resides in the provision of a construction wherein in addition to printing data derived in whole or in part of the master film upon one or more detail films, such data may be supplemented with duplication data derived from one or more setup devices of the machine.

A further object of the present invention resides in the provision of a film printing machine having novel aligning and synchronizing means for the films whereby accuracy of printing and analyzing may be effected.

A further object of the present invention resides in the provision of a film printing machine having novel control means to control the machine for last frame master film conditions.

A further object of the present invention resides in the provision of a construction wherein selectively manipulable means are provided to enable a common machine to be selectively set up in different ways whereby a great multiplicity of different kinds of printing operations may be effected.

A further object of the present invention resides in the provision of novel controls for film printing machines to enable certain operations to be initiated in one cycle, but actually brought about in later cycles.

A further object of the present invention resides in the provision of a novel form of film feeding means for a film printing machine including a high speed drive and slow speed drive and controls therefor.

Further and other objects of the present invention will be hereinafter set forth in the accompanying specification and claims and shown in the drawings which show by way of illustration preferred embodiments and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

In the drawings:

Fig. 2 is a detail front elevational view of the film printing mechanism, the view being taken substantially on lines 2—2 of Fig. 1 and looking in the direction of the arrows. In this view the front cover of the housing is shown removed to show the interior construction;

Figure 1:
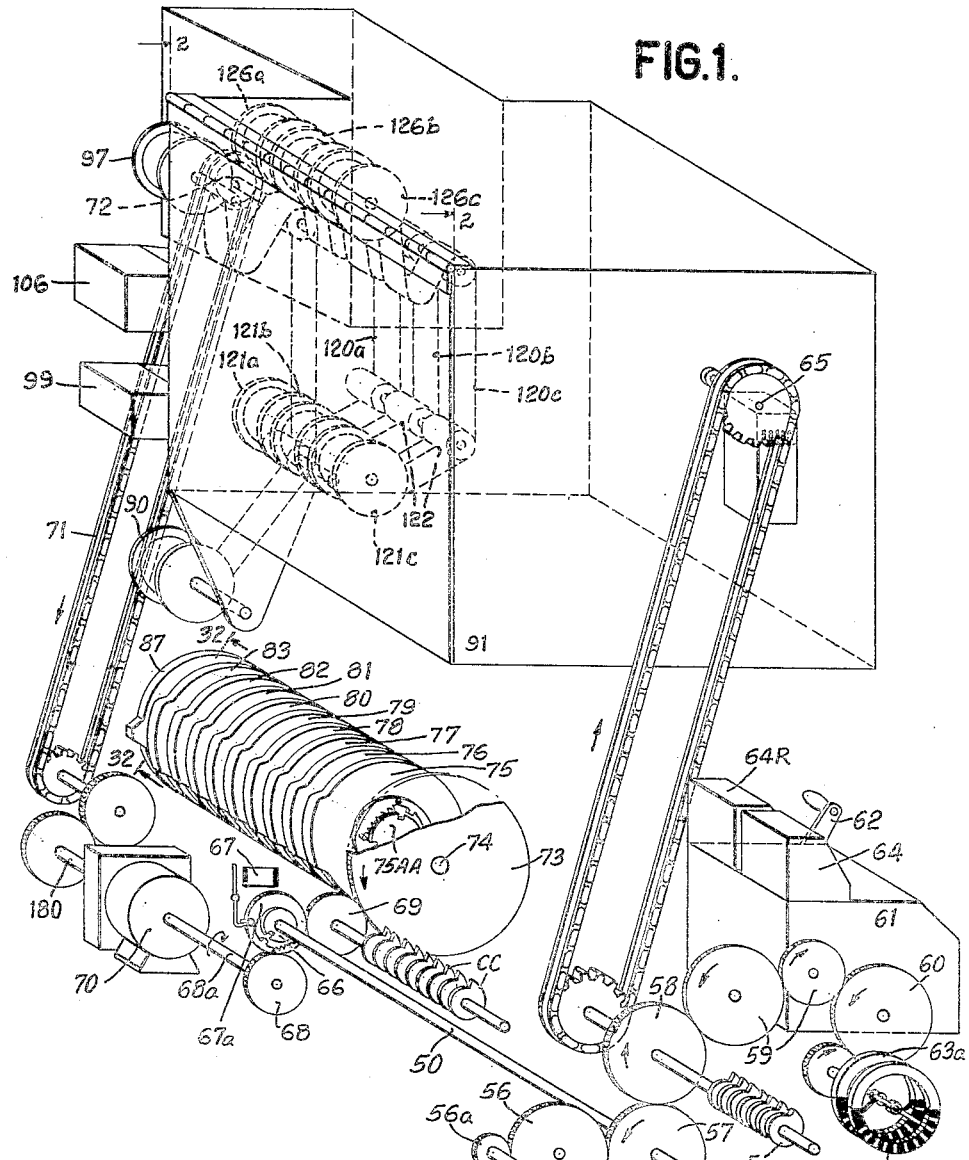
Figure 1 is a diagrammatic view which shows the general relation of the various units of the machine, the driving mechanism therefor and certain cam contacts which are used in the machine.
Figure 28:
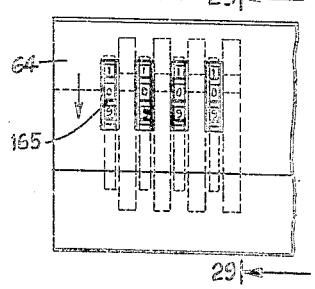
Figure 4:
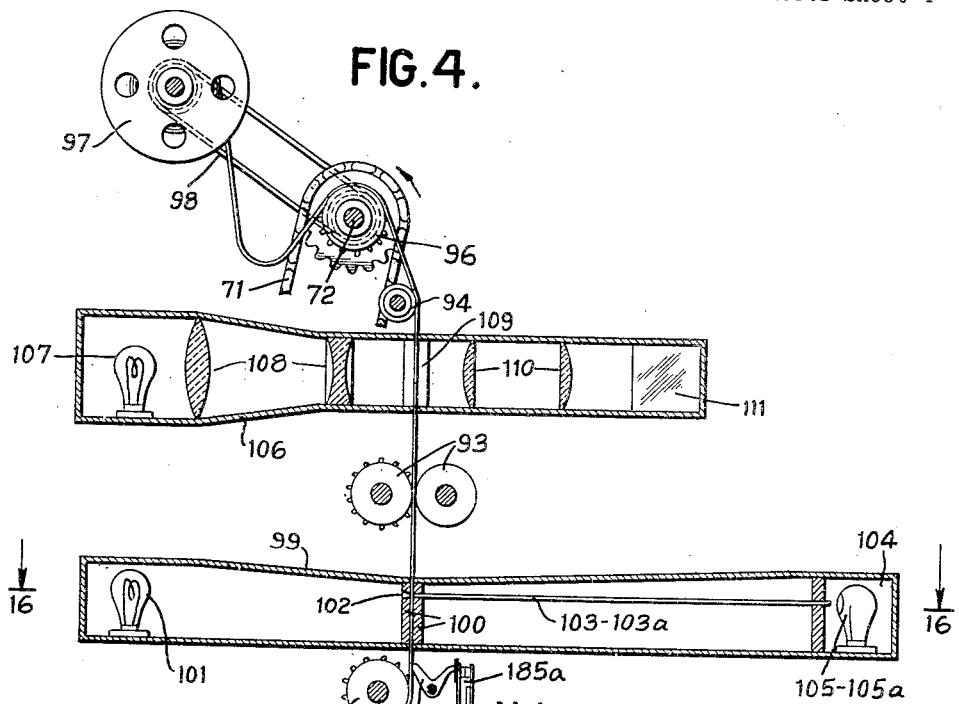
Figure 14:
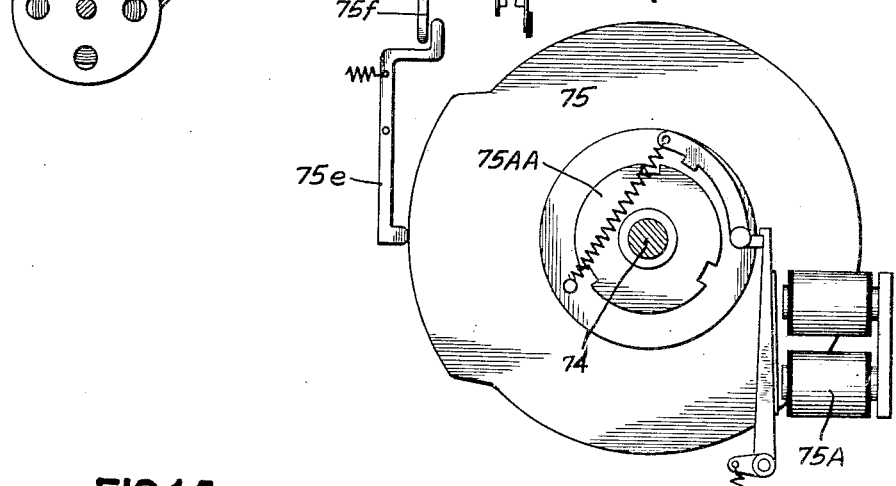
Figure 14A:
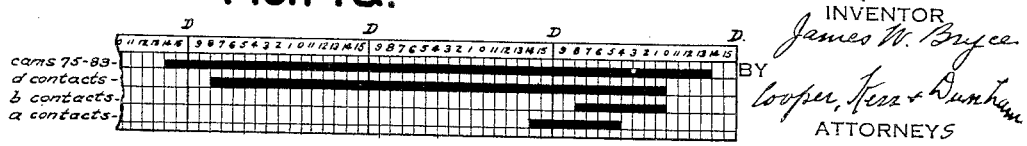
Figure 10:
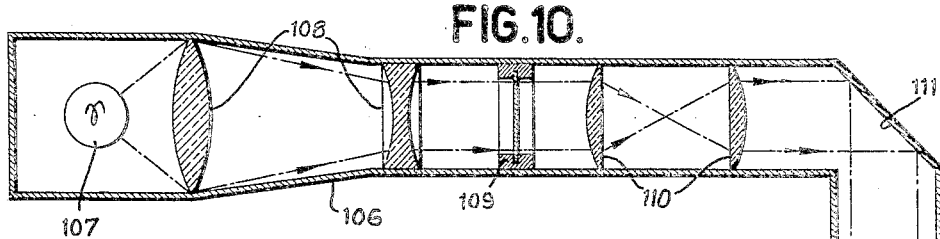
Figure 11:
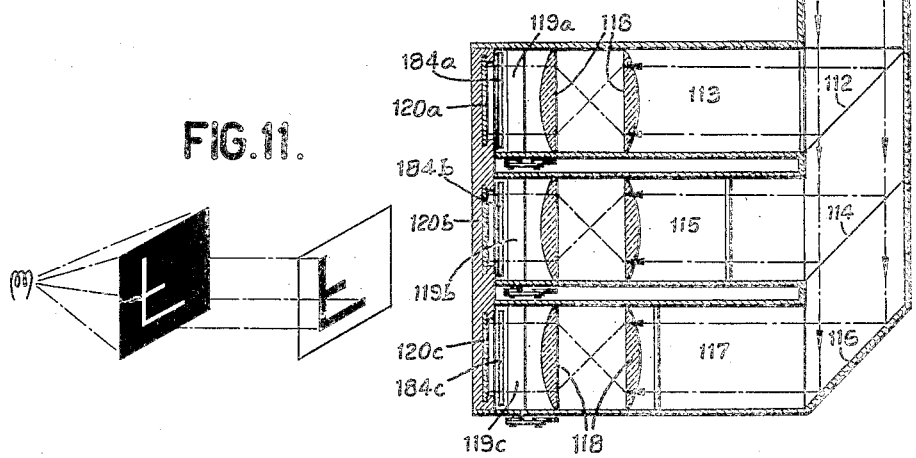
Figure 12:
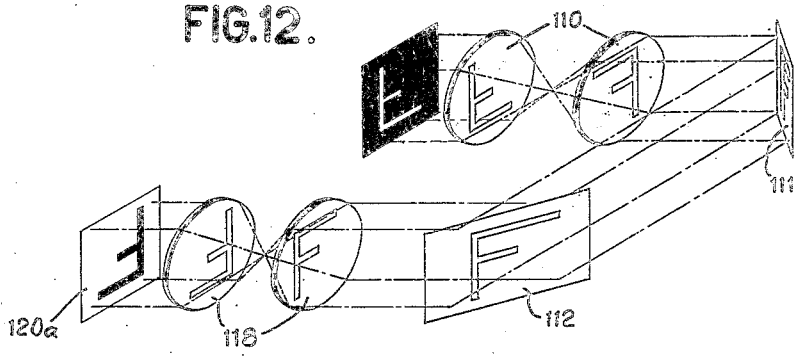
Figure 17A:
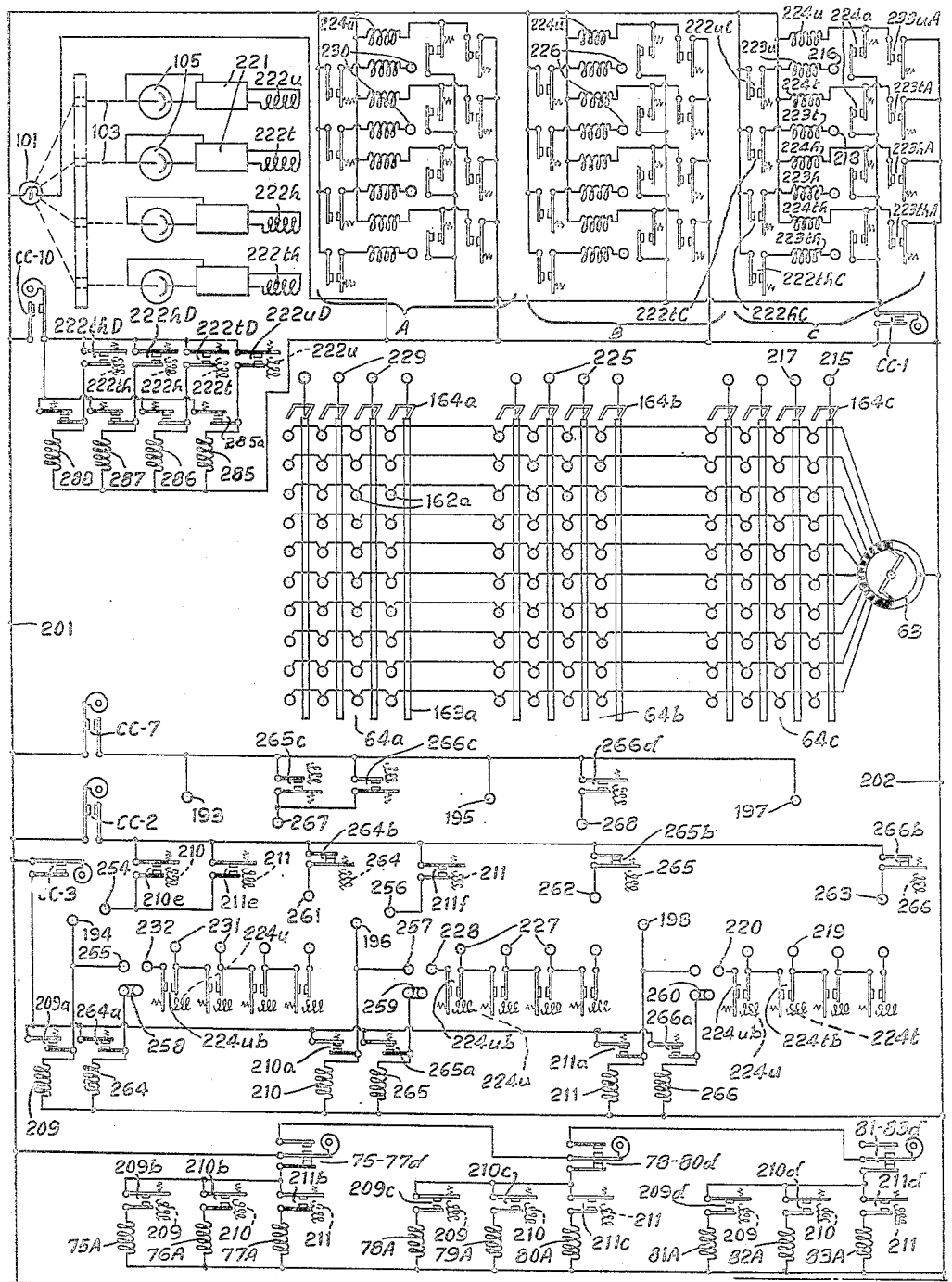
Figure 17B:
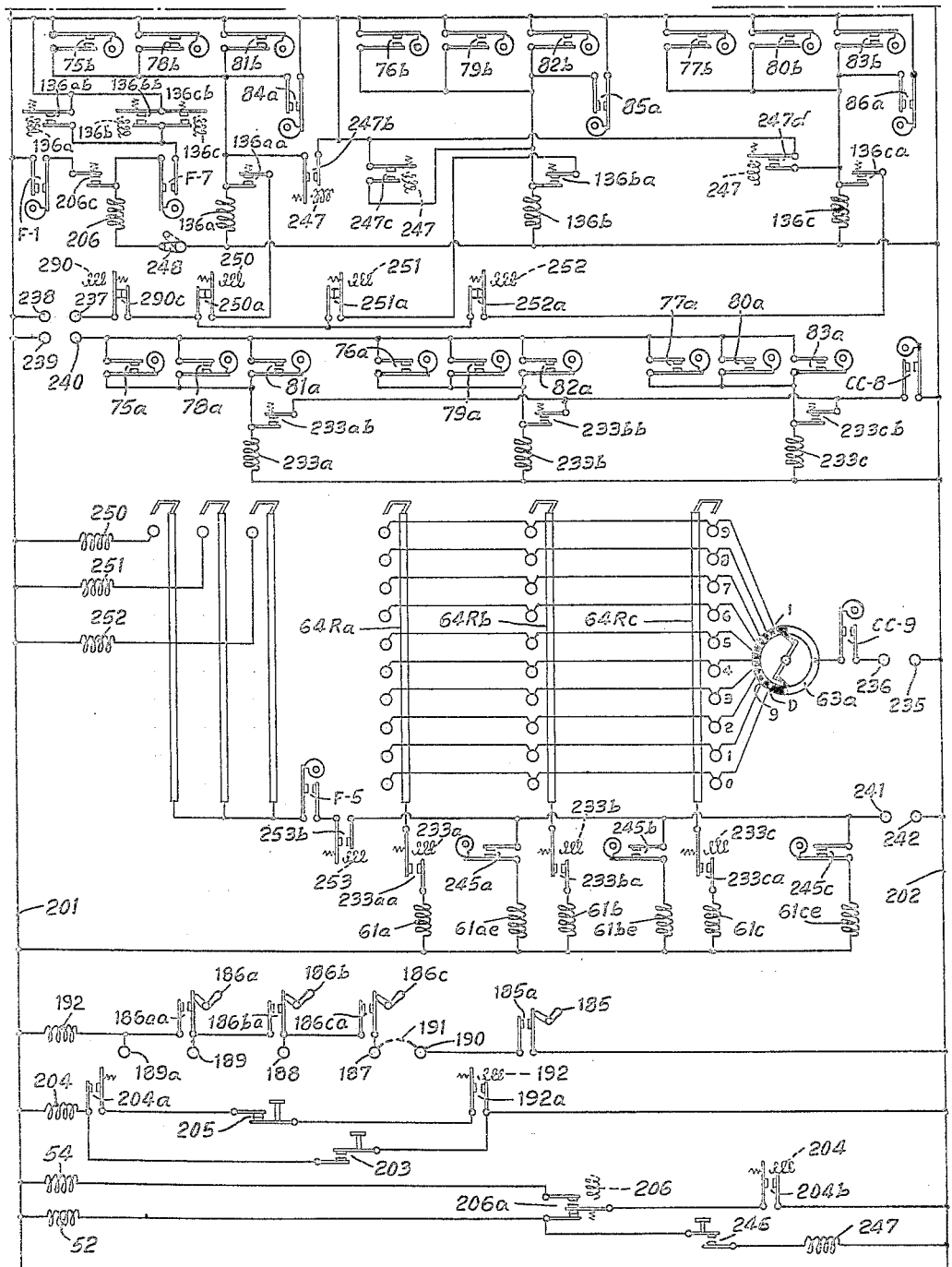
Figure 18A:
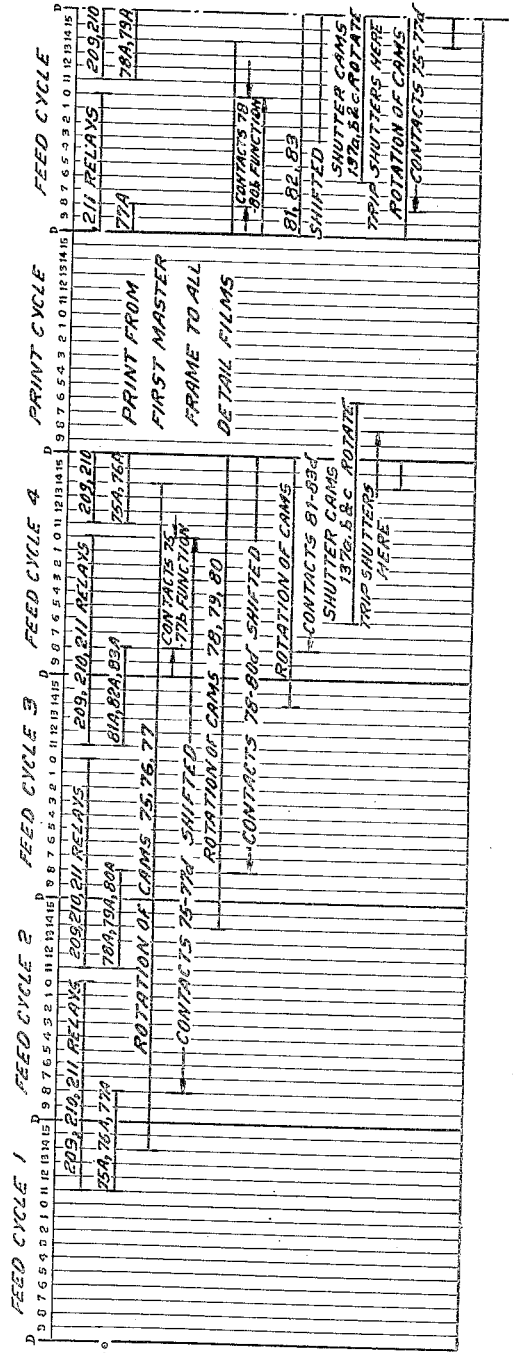

Fig. 3 is a top plan view of the mechanism which is within the housing. The top cover of the housing is removed. This view is taken substantially on line 3—3 of Fig. 2 looking in the direction of the arrows;

Fig. 4 is a detail sectional view taken on line 4—4 of Fig. 2 and showing the master film feed;

Fig. 5 is a detail view taken on line 5—5 of Fig. 2 and shows details of the driving mechanism for one of the detail films;

Fig. 5a is a timing diagram for one of the detail film feed cams. This view shows the time of contact closure for the contacts operated by this particular cam and also shows the time in the cycle of the machine when the cam is rotating;

Fig. 6 is detail sectional view showing the interior of one of the hand setup devices. This view is taken substantially on line 6—6 of Fig. 9, looking in the direction of the arrows;

Fig. 7 is a detail view of the duplicating unit. The view is taken substantially on line 7—7 of Fig. 2 and shows the structure which provides for the printing of hand set up data on detail films;

Fig. 8 is another detail view of one of the hand setup devices for hand set up data. This view is taken substantially on line 8—8 of Fig. 7, looking in the direction of the arrows;

Fig. 9 is a similar detail view of another hand setup device, the view being taken substantially on line 9—9 of Fig. 7;

Fig. 10 is a detail view showing the lens, prism, and reflecting system which is used to transfer data from a master film to one or more detail films. The view is taken substantially on line 10—10 of Fig. 2;

Fig. 11 is a diagrammatic view which shows diagrammatically the results which would be obtained by contact printing. This view is provided in order to show that the lens and prism system employed in the instant machine obtains the same ultimate results as direct contact printing;

Fig. 12 is a diagrammatic view showing the lens and prism system and this view shows the manner in which data is optically transferred from the master film to one of the detail films through the lens and prism system. This view shows the various reversals of images and reflections of images;

Fig. 13 is a detail view of several of the clutch control cam contact devices, the cams of which are shown diagrammatically in Fig. 1;

Fig. 14 is a side view of one of the cam contact and individual clutch assemblies. This view is substantially an end view of the clutch and cam contact arrangement shown to the extreme right of Fig. 13 and may be considered to be a view looking in the direction of the arrows 14—14 of Fig. 13;

Fig. 14a is a timing diagram of the cam and contacts shown in Fig. 14 and this view shows the time of contact closure and the time of cam rotation with respect to the cycles of the machine;

Fig. 15 is a detail view of one of the insertible masks used in the machine. This view is taken substantially on line 15—15 of Fig. 5, looking in the direction of the arrows;

Fig. 16 is a detail view of the analyzing unit and shows the manner of transmitting light from the master film to the photo-sensitive cells. The view is taken substantially on line 16—16 of Fig. 4;

Figs. 17a, 17b and 17c, taken together and arranged vertically in the order named with Fig. 17a at the top, show the complete circuit diagram of the machine;

Figs. 18 to 27, inclusive, illustrate diagrammatically various kinds of operations adapted to be performed by the machine. Ten different operations are here shown;

Figs. 18a, 21a to 27a inclusive, show timing diagrams of the machine under different operating conditions. Timing diagram, Fig. 18a, shows the timing relations of the various parts and the succession of cycles which are made when the machine is effecting the operations of Fig. 18. Each of the other timing diagrams is related to the correspondingly numbered diagrammatic operation of Figs. 21 to 27 inclusive;

Fig. 28 is a front view of one of the hand setup devices for control number data;

Fig. 29 is a detail sectional view taken on line 29—29 of Fig. 28 and shows constructional details of this hand setup device;

Fig. 30 shows a section of a master film. For clearness in illustration, the film delineated is a positive, but in practice and in the machine a negative of such positive would be used;

Fig. 31 shows a cam control contact and clutch mechanism which is used for controlling machine operations for a last frame condition. This view may be considered as taken on line 31—31 of Fig. 1, looking in the direction of the arrows;

Fig. 31a shows the timing diagram for the cam and contact mechanism shown in Fig. 31. This view shows the time of contact closure and the time of cam rotation with respect to the machine operating cycle;

Fig. 32 shows another cam control clutch and contact mechanism used for controlling machine operations for a last frame condition. This view may be considered as a view taken on line 32—32 of Fig. 1, looking in the direction of the arrows;

Fig. 32a shows the timing diagram for the cam and contact mechanism shown in Fig. 32. This view shows the time of contact closure and the time of cam rotation with respect to the operating cycle of the machine; and Fig. 33 shows a cam contact timing diagram. This view shows the contact timing for the CC group of cam contacts and for the F cam contacts.

*Machine drive*

Referring to Fig. 1, 50 designates the main drive shaft of the machine. Two drives are provided for this drive shaft. One drive which may be termed the "high speed drive" comes from a motor 51, which is adapted to be clutched to the main drive shaft 50 by an electromagnetic clutch 52. Another drive, which may be termed a "low speed drive" comes from a separate motor 53, which is adapted to be clutched by an electromagnetic clutch 54 to a shaft 55. A reducing gear train 56a, 56, drives a gear 57 which is fixed upon shaft 50 and thus provides a relatively low speed drive for such drive shaft 50. Gear 56 also drives a gear 73a and the gear ratio is such that 73a rotates once for every three revolutions of gear 56. Gears 56 and 57 have a one to one ratio so that gear 73a makes one revolution for every three revolutions of shaft 50. Gear 73a is fixed to a shaft 74a which shaft provides a drive for cams 84, 85 and 86. These cams are clutched to the shaft in a manner which will be subsequently described. Gear 57 also through a train of gears 58, 59 and 60 drives an accumulating unit generally designated 61, which unit is adapted to be reset by hand by means of a resetting handle 62. Conventional impulse emitters 63 and 63a are also driven from gear 60. The accumulator housing forms a support for hand setup devices which are generally designated 64 and 64R. The details of the construction of these hand setup devices are shown in Figs. 28 and 29.

Driven by the shaft carrying gear 58 are seven so-called F cams for operating cam contact devices. These cam contacts make one revolution for each revolution of the shaft 50. A chain and sprocket drive from the shaft of gear 58 drives a drive shaft 65 of the film printing unit. Shaft 50 constantly drives the disc element 66 of a conventional one-revolution clutch. This clutch is of the type customarily used in the tabulating machine art, see Fig. 1a of United States Patent No. 2,045,437 to Daly, dated June 23, 1936. It is adapted, on energization of magnet 67, to couple the shaft 50 for one revolution to a gear 67a, which in turn drives gears 68 and 69. Gear 68 in turn drives a synchronizing unit 70, which synchronizing unit, through a chain and sprocket drive 71 drives a drive shaft 72 for feeding the master film. Driven by gear 69 are a number of CC cam contact devices. These cam contact devices rotate through one revolution every time the one-revolution clutch 67 and 67a is called into operation. Gear 69 in turn drives a gear 73 which drives a shaft 74. The driving relation of gears 69 and 73 is such that the shaft 74 makes one complete revolution upon three revolutions of the main drive shaft 50. Rotatably disposed on shaft 74 are ten contact cams which are designated 75 to 83 inclusive and 87. Each of these cams is adapted to be clutched to the shaft 74 by an electromagnetic one-revolution clutch of the type previously described.

Referring to Fig. 14, 75A designates the one-revolution clutch magnet for clutching contact cam 75 to the shaft 74. The conventional clutch disc 75AA is provided with three notches on account of the three to one driving ratio of shafts 50 and 74. It will be understood, that upon energization of any electromagnet, such as 75A its corresponding contact cam 75 will be driven through one complete revolution. Such rotation through one revolution will, however, require three revolutions of the main driving shaft 50.

Referring to Fig. 14a, in this timing diagram the upper line shows the cyclic time of rotation of any one of the cams 75 to 83 inclusive. It will be noted that a cam starts to rotate at the fourteenth index point in one cycle and such cam rotates through three cycles before its rotation ceases. It may be explained that each cycle as shown on this timing diagram from D to D represents one complete rotative cycle of the CC cam contact devices which are shown in Fig. 1. Each cycle of rotation of the CC cam contact devices corresponds to a master film feed cycle. On Fig. 14a, the second timing line shows the time at which contacts such as 75—77d and similar contacts are in a shifted position. The third timing line from the top shows the time during which contacts such as 75b are closed. The fourth timing line from the top shows the time during which contacts such as 75a are closed.

Each of the various cams 75 to 83 is adapted to directly operate two sets of electrical contacts, viz., 75a, 75b (see Figs. 13 and 14).

Referring now to Fig. 13, upon rotation of any one of the cams 75, 76 or 77, contacts 75—77d will be caused to operate. This contact set is operated through a contact operating bail provided with depending arms 77f, 76f and 75f, which respectively cooperate with spring pressed bell crank levers 77e, 76e and 75e. On rotation of any cam such as 75 its cooperating bell crank lever 75e will swing under spring action and rock 75f and cause the contacts 75—77d to shift to reverse position.

It will be understood that the cams 78, 79 and 80 shift a corresponding set of contacts 78—80d and cams 81, 82 and 83 shift a corresponding contact group 81—83d.

Fig. 14 shows the arrangement for cam 75 and like reference numerals will be used on this figure to correspond with Fig. 13.

It will also be understood that each of the cams 76 to 83 inclusive, also operate contacts like 75a and 75b and such contacts will be correspondingly designated on the circuit diagram thus, 76a and 76b will designate the cam contacts which are directly operated by cam 76.

Disposed on shaft 74 is another clutch operated cam 87 which operates contacts such as 87a (see Fig. 32 and Fig. 32a) which shows the timing of contact operation.

Cams 84, 85 and 86 are adapted to be clutched to shaft 74a by clutches similar to those previously described under the control of magnets 84A, 85A or 86A (see Fig. 31). These cams operate contacts such as 84b, 85b or 86b and contacts 84c, 84a, 85a, 86a, it being noted that only cam 84 is provided with a contact of the 84c type. The time of contact is shown in Fig. 31a.

On account of possible shrinkage and/or expansion of the master film under temperature changes and on account of the fact that accurate registrations must be had for each master film frame, provision is made for synchronizing the master film feed as each frame is fed and advanced to a reading station.

As will be hereinafter described the master film is provided with a synchronizing spot and light sensing means are provided to sense by light the position of such spot. A photo-cell arrangement in turn controls the energization of a synchronizing magnet. The synchronizing unit is provided to align each master film frame properly at the reading station and also to properly coordinate the cam timing with each master film frame. It will also be understood that if a master film frame is properly aligned at the reading station it will also be properly aligned at the printing station, to which the frame is fed from the reading station. The synchronizing unit generally designated 70 (Fig. 1) is of any suitable type. For example, it may be that shown in the United States patent to Lemmon, No. 2,019,864, dated November 5, 1935, and shown in Fig. 4 of that patent.

It will be understood that gear 68 (Fig. 1) is driven with a slight over drive, i. e., gear 68 is slightly smaller in diameter than gear 67a or gear 69. Gear 68 drives a shaft 68a which shaft corresponds to the input drive shaft 102 of Fig. 4 of the Lemmon patent. Shaft 180 (Fig. 1) corresponds to shaft 62 of Fig. 4 of the Lemmon patent. The synchronizing magnet 181 is not shown in Fig. 1, but is shown on the circuit diagram (Fig. 17c). Such synchronizing magnet 181 corresponds to the synchronizing magnet 106 of Fig. 3 of the Lemmon patent. According to the mode of operation of the synchronizing device of the Lemmon patent, energization of the magnet 106 of that patent retards the drive of the output shaft, relative to the drive of the input shaft and again lets it advance when the parts are in proper synchronism.

With the present synchronizing device, no provision is made for accelerating the drive of the output shaft. Accordingly, the magnet 84 of the Lemmon patent and its parts are not utilized. The accelerating control is unnecessary because this is taken care of by the initial over drive on shaft 68a (Fig. 1).

Master film drive

Referring now to Fig. 1, 90 designates a supply reel for the master film. This supply reel is preferably located below the bottom of the housing of the printing unit and the master film feeds up through a suitable slot in the base of the printing unit (see Fig. 4) and passes over a guiding sprocket 92 and thence upwardly over idler guiding sprockets 93, then over another idler sprocket 94 to a drive sprocket 96. Film drive sprocket 96 is fixed on the drive shaft 72 (see Fig. 1) which was driven in the manner previously described. A take-up reel 97 is driven in any suitable manner as by a belt and pulley drive 98 from shaft 72.

Synchronizing of master film drive

Referring to Fig. 1, the gear relation of gear 67a and synchronizing unit 70 are such that a slight over-drive is imparted to the synchronizing unit. The synchronizing unit is electromagnetically controlled and once for each frame, provision is made to synchronize the position of the film by energizing a magnet of the synchronizing unit. The manner of controlling the synchronizing unit will be hereinafter explained in the description of the circuit diagram.

Master film analyzing unit

Referring to Fug. 4, it will be noted that from sprocket 92, the film feeds upwardly through an analyzing unit. The analyzing unit comprises a housing 99 (Fig. 4, see also Fig. 16), provided with a film guide 100. Within the analyzing unit at one end is a source of light such as a lamp 101 and the film guide 100 is provided with an aperture 102 (Fig. 16) to admit light to one section of the film. From this particular section of the film, which is to be analyzed, quartz rods 103 extend in a divergent manner to the rear of the analyzing unit and extend into housings such as 104 which individually house light sensitive cells 105. With the analyzing unit shown, four columns of the film are adapted to be analyzed, accordingly, four light sensitive cells 105 are provided and four quartz rods 103. The columns on the film which are to be analyzed are in close proximity to one another and upon a transparent spot on the film passing in front of one of the quartz rods 103 light will be emitted from the source 101 through the transparent spot on the film, through the corresponding quartz rod to activate the corresponding photo-electric cell 105.

For synchronizing the master film feed, a transparent spot on the film is utilized at the other side of the film. Light is transmitted from the synchronizing spot through a quartz rod 103a, to a photo-sensitive cell 105a for controlling synchronizing of the master film feed.

Master film reading unit

Referring again to Fig. 4 after the section of the film is analyzed, the film is fed further upwardly past the sprockets 93 and into a reading unit, the reading unit housing is generally designated 106 in Fig. 4. Within the reading unit is a source of light 107. From the source the light passes through a condensing lense system 108 (see also Fig. 10) and thence trans-illuminates the film which is guided through an inspection or scanning frame at 109. Thereafter the film images are inverted by a lens system 110. From the inverting lenses 110 the film image intercepts a reversing mirror 111 (see Fig. 10) and from this reversing mirror the images follow the path indicated in Figs. 10 and 12. Such film images pass to a prism 112. This prism 112 is of intercepting type and may be of the form shown in United States Patent No. 1,319,292 to Kuntz, dated October 21, 1919. The prism 112 reflects the film image into a tubular housing 113 and permits the image to also pass through the first intercepting prism to another intercepting prism 114, which reflects the image into a tube 115 and permits the image to also pass through the prism to be intercepted by a reflector 116. From this reflector the film image is reflected into a tube 117. Tubes 113, 115 and 117, each are provided with a re-inverting lens system generally designated 118 and each of the identical images in the tubes 113, 115 and 117 after passing through the re-inverting lens system 118 and shutters 119a, 119b and 119c are directed upon detail films 120a, 120b and 120c. The detail films are guided in suitable guides in the reading housing.

Before describing the manner of detail film feed, it may be explained that data read from the master film is desired to be transferred to one or more of the detail films 120a, 120b, 120c, that is to say, data derived from a master film is used to expose and be duplicated on the light sensitive detail films. In some cases the data is duplicated on one, some on two and some on three as will be hereinafter fully explained. The ultimate effect of the lens system shown in Figs. 10 and 12, is to give on the detail light sensitive film the same image as would be obtained by direct contact printing. Fig. 11 shows diagrammatically direct contact printing of the letter F and this view is here shown for comparison with Fig. 12.

Detail film drive

Referring now to Figs. 2 and 5, the several light sensitive detail films 120a, 120b and 120c are carried upon supply rolls 121a, 121b and 121c (Figs. 2 and 5). Inasmuch as the drives for each of the detail films are the same, one of them will be described in detail. From supply roll 121b, (Fig. 5) detail film 121b passes over a guide roll 122, thence upwardly through the printing unit housing 106, being suitably guided therein in front of shutter 119b. From this point the film passes upwardly through a duplicating housing, being guided therein, the duplicating housing being designated 123. Each film has in front of it in the duplicating housing a duplicating shutter 124b and from the printing point in such duplicating housing the film passes to a feed sprocket 125b and thence to a take-up roll 126b. Take-up roll 126b is driven in any suitable manner as by belt and pulley 127b from the shaft which drives the sprocket 125b.

A customary Geneva drive 128b is provided for the film sprocket 125b and such Geneva drive in turn receives its drive from a pin 130b upon a disc which is driven by a gear 131b. Gear 131b in turn meshes with an intermediate gear 132b which in turn is driven by a gear 133b receiving its drive from a one-revolution clutch 134b. The one-revolution clutch is of the customary electromagnetically controlled type and it is adapted to be driven from a shaft 65.

Reference numeral 136b designates the clutch magnet for calling into operation the drive for the 124b film. Gear 133b also has fixed to it a shutter operating cam disc 137b which upon rotation, operates the shutter operating tripping arm 138b, which in turn trips open shutters 124b and 119b. A similar form of drive is provided for each of the detail films 120a and 120c and the description of one drive will suffice for all. Cam 137b closes contacts 245b after it has completed almost a third of a revolution.

Shaft 65 it may be stated is, however, a common drive for all of the detail film feeds. Such shaft 65 (see Figs. 3 and 1) is driven from the main drive shaft 50 in the manner previously explained (see Figs. 1 and 2).

It will be appreciated that by energizing a detail film feed clutch magnet such as 136b, the corresponding detail film will be fed. Three detail film clutch magnets 136a, 136b and 136c are provided, each upon energization calls into operation its corresponding film feed. Each of the gears such as 133b in turn drives a gear 140b, which in turn drives a gear 141b. Each gear such as 141b has fast to it the notched element of a one-revolution clutch and the other element of such clutch comprises a cam disc 142b, which is adapted to be clutched to the gear 141b upon energization of the corresponding magnet 143b. 142b is a contact cam for operating corresponding contacts, the contacts being designated 143b-1 on the circuit diagram.

It will be understood that there are three clutch magnets 143a, 143b and 143c and that there are corresponding cams 142a, 142b and 142c. The driving relations for the contact cams 142a, 142b and 142c are such that these cams make one complete revolution upon three revolutions of the driving gear for the detail film feed.

Duplicator unit

It has been previously explained that according to this invention, data is read off from the master film and printed on one or more of the detail films. After passing the printing unit, each detail film is fed through a so-called duplicating unit. Briefly the purpose of this duplicating unit is to enable other data to be printed upon one or more of the detail films.

The general purposes of the duplicator unit will be best understood by reference to Fig. 7. In this figure the three detail films 120a, 120b and 120c are shown. Each detail film when in the duplicating unit is adapted to receive hand set up numerical data from a hand setup device.

Referring to Fig. 7, the duplicator section housing 123 is provided with three funnellike extensions 123a, 123b and 123c. Each of these housings is provided with a luminous source of illumination such as lamps 150. Referring now to the 123b housing, the hand setup device for the numerical data is here designated 151b. Such hand setup device comprises a series of knurled setting wheels 152 (Fig. 9) which project through slots in the housing wheel and which by the gearing shown vertically position racks 153, which racks carry an extension formed with a round end defining a spot 154b (see also Fig. 6). This spot or stud is preferably light colored or white and the adjacent inner portion of the case is dark in color as is indicated in Fig 6. The spots 154b extend through slots in the casing and it will be understood that by turning a setting knob 152, the corresponding spot can be put to the desired vertical position of adjustment. The knurled knob 152 is preferably numbered with indicating numerals on its periphery so that it can be set to any one of eleven positions. Ten of these positions are representative of the digits from 1 to 9 and zero and the other position is a blank position at which the spot 154b is masked by a mask 154M. By turning the setting knob away from the blank position the spot 154b will be brought out from behind the mask and can be exposed for duplicating purposes. Its differential vertical position will represent the corresponding numeral value.

It will be understood that by turning the various knobs associated with any of the hand set up units, any desired number can be indicated. As shown, the capacity of hand setup devices is six columns. In front of the funnel extension 123b there is a lens 155 (Fig. 7) which directs the image received from the spots of the hand setup device to the detail film 120b.

The means for placing data on the 120a and 120c films is substantially the same as above described, except that there is a reflector 161c, 161a, disposed intermediate the two lenses. Also two lenses are used instead of a single lens as in the previously described embodiment. With this arrangement of lenses and with the intermediate reflecting surface 161, the spots on the rack 153 must be differently disposed, that is in place of being at the top of the rack they are at the bottom as indicated at 154ac.

It will be understood that so-called duplicate data which will be understood to comprise the hand set up data can be placed on one or more of the detail films 120a, 120b and 120c as desired.

It has been previously explained that a hand setup device 64 is provided which is preferably disposed on the top of the accumulator 61. This hand setup device comprises a series of knurled wheels 165 (Figs. 28 and 29). The hand setup devices are generally along the lines of Figs. 5, 6, 7 and 8 of British Patent No. 428,794 of 1933. The hand setup device generally corresponds to a readout having a segment generally designated 162 with ten conducting spots and provided with a single common segment 163. The brush assembly is generally designated 164 and such assemblage may be positioned by turning knurled wheel 165. The periphery of this knurled wheel may be provided with certain designating indicia and the wheel may be impositively held in any set position by a spring detent 166. Preferably each control number setup device is for four columns, i. e., each is of a four-wheel type, one being provided for each detail film so that there are three sets of control number setup devices, each having four wheels and comprising a total of twelve wheels in all three sets. By this arrangement a control number can be set up for each detail film.

*Master film*

Fig. 30 shows a positive film corresponding to a negative, the negative film being used in controlling the instant machine. However, for clarity of delineation a positive film has been shown. In Fig. 30, the perforations designated 170 represent the feed apertures in the film. The data represented at 171 represents a photographic facsimile representation of a document such as a check. The spot representations in zone 172 represent amounts which may be photographed on the film and represent amounts pertaining to any given data. The data represented in zone 173 represents numerical control data.

In practice the master film may or may not contain a representation of a document such as the bank check as shown at 171. In the delineated showing of the master film the shown film is a positive, but in practice it will be understood that a negative film will be used because the spot representations must be transparent instead of dark as shown in the drawings.

The spots 174 on the film represent the synchronizing spots thereon.

Referring now to Figs. 18, 19 and 20, these figures show several of the simplest film printing operations which can be performed by the machine. In Fig. 18, the data is derived from each frame of the master film and is imprinted on all three of the detail columns and printing is effected in this manner for all frames of the master film. In Fig. 19, on the other hand, the data derived from each frame of the master film is imprinted on the 120a detail film and the 120c detail film and no data whatsoever is printed on the 120b detail film.

According to Fig. 20, the machine can be so set to print the data derived from each frame of the master film to only one detail film, i.e., the 120b detail.

Referring now to Fig. 21, this shows another type of operation wherein the hand setup devices for control numbers associated with the detail films are used and wherein a control unit is also employed. According to this type of operation, the hand setup device for the 120c detail film will be set up for a control number, say 10. Then when a control number 10 is analyzed on any frame of the master film, this particular frame will be printed on the c detail film. There will be no printing on the 120a and 120b detail films because there has been no setting of the hand setup control number devices for either of these films.

Referring now to Fig. 22, here the hand setup control number devices for two of the detail films, viz., 120a and the 120b films are set up with a common control number, for example, 3, then on a three control number being analyzed on the master film there will be printing effected on both the 120a film and the 120b film. It is obvious that if the same three control number was set up on all three control number setup units there would be printing on all three detail films.

Fig. 23 shows another type of operation. Here in addition to setting up the control number setup devices for the 120b film there is another setup device set up to determine the number of repeated printings of the same data. That is to say, the number of times setup device for the 120b film is set with the number 4. A control number is set up for the 120b film, say 9. Then, upon 9 being found on the master film in the control number field, the data from this frame of the master film will be printed repeatedly, i.e., four times on the 120b detail film. The four printings are controlled by the setting of the number of times setup devices for the 120b film, which, as explained before, is preset to 4.

Figures 24C, 25C, 26C:
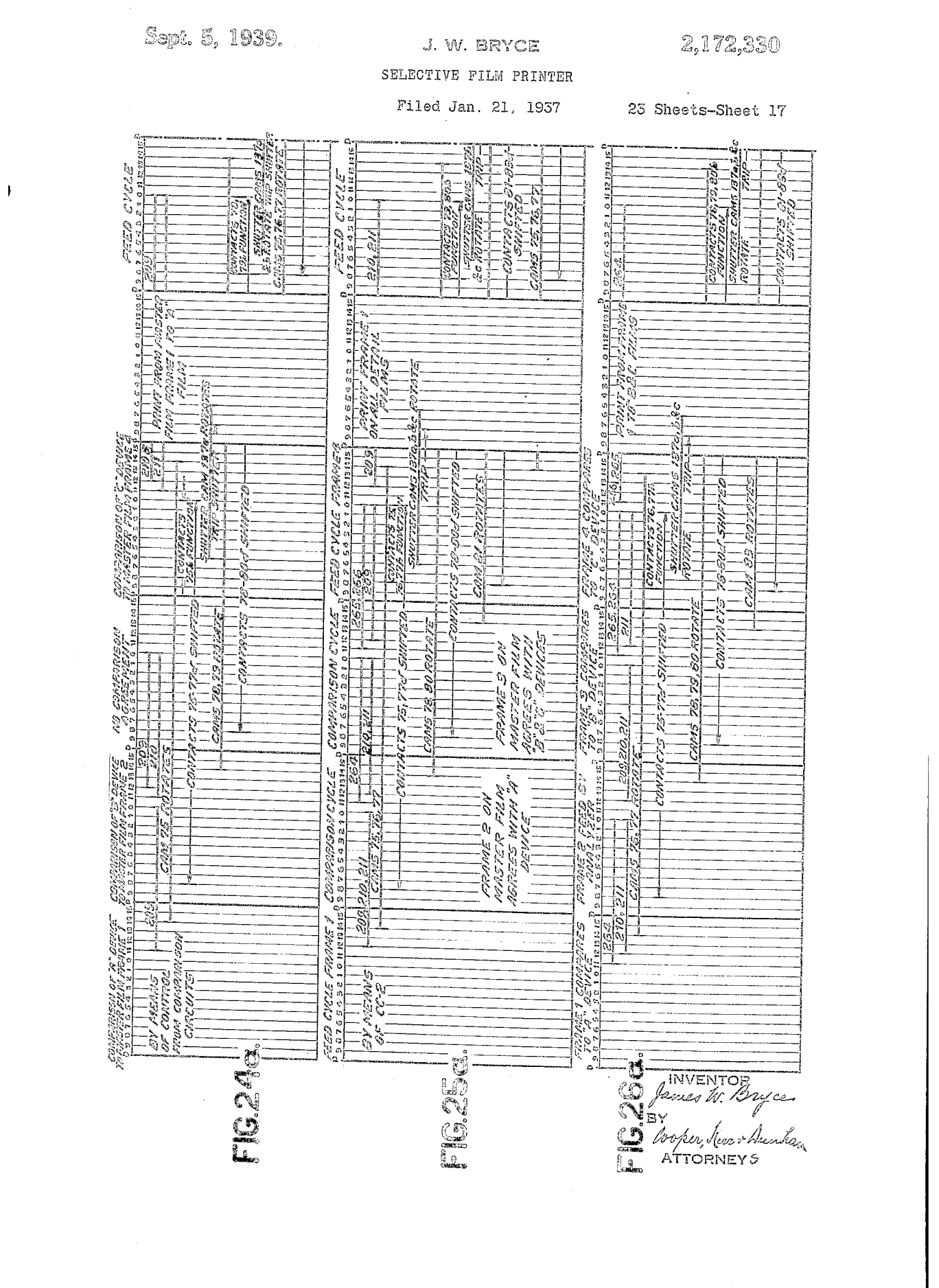

Fig. 24 shows diagrammatically another type of operation which can be performed. In this case there are settings of the control numbers on the control number setup devices for all three detail films. If a control number sensed on the master film agrees with the a control number setup there will be printing only on the 120a film. If, on the other hand, the control number from the master film agrees with the control number set up on the b film setup device then there will be printing on the 120a and 120b film. Likewise if the control number on the film agrees with the control number set up on the c setup device there will be printing on all three films, 120a, 120b, and 120c.

Referring now to Fig. 25, here the effect of a comparison control between a setup control number and a control number from the film is reversed, that is to say, if a setup control number matches with a control number read from the film printing will be eliminated on the film or films where such matching comparison occurs with the setup devices. As shown, the a setup device is set up with control number 6, the b with 9 and the c with 9.

Referring now to the master film, the first frame has a control number 4 which does not match with either 6 or 9. Accordingly, the data from this particular frame is printed on all detail films. The next frame of the master film, however, has a control number 6. 6 compares with 6 on the a setup device so printing is eliminated on the 120a detail film but permitted on the 120b and 120c detail films.

Referring to the third frame where the control number is 9, there will be omission of printing on both the 120b and 120c films because their setup devices have been set to 9.

Fig. 26 shows another type of control that may be used. Here if control data read from the master film compares with data on one setup device, printing will be suppressed on one film. If the film compares with data on another single setup device, printing will be suppressed on two detail films. If the data compares with the data on still another single setup device, printing will be suppressed on all three detail films. It will be noted that upon a comparison occurring between data from the film with data on a single device suppressing of printing may be effected on more than one film. Here control No. 3 is set up upon the A device, 9 on the B device and 4 on the C device. On 3 matching, printing is prevented on the 120a film. With 9 matching, printing is prevented on the 120a and 120b films. With 4 matching, printing is prevented on all three detail films.

Fig. 27 shows diagrammatically another type of operation which may involve any of the previously mentioned controls, but which in addition, involves the feature of blocking out certain printing from the master film to one or more of the detail films and which includes also the further feature of printing duplicate data in such blocked out zones, the duplicate data being derived from the setup devices in the duplicating unit. In this figure, the last column of film 120a has been blocked out so as to receive no printing from the master film. Similar blocking out in the last column is provided on the 120b film and the 120c film blocks out a middle column. As shown in the lower part of the figure, the blocked out last column of the 120a film receives data from the set up of the duplicating unit, viz. numeral 4, the 120b film receives 6 from the duplicating setup unit in the last column and the 120c receives 5 from the duplicating unit in the middle column.

In certain cases where it may be desirable to block out a column or columns of data which would normally be derived from the master film and which would be printed on one or more of the detail films insertable masking means such as shown at 182 (Fig. 15) are provided. These devices 182 have mask barrier portions 182a which may be of any desired width so as to block one column or more than one column and the barrier portions 182a can be in any desired relative position to the right or left so as to mask any desired column or columns. Such insertable masks 182 are inserted through the bottom of the housing as shown in Fig. 5. Here 182 represents a mask inserted in position. The mask is preferably passed through a slot in the housing and a light trap 183 is provided to prevent the ingress of light when the slide 182 is not in place. The mask 182 passes upwardly and may be received in guiding slots 184a, 184b and 184c (see Fig. 10) in the detail film housing. It will be understood that any number or none of these masks may be used depending upon what data is desired to be blocked out in printing. It will also be understood that a number of these insertable masks can be supplied with the barriers in different places and with duplicates thereof for selective use as desired.

Referring to Fig. 4, a lever 185 is provided disposed in the line of travel of the master film and arranged when the film is in contact therewith to close contacts 185a. Similar film detecting levers are provided for each of the detail films, one of which is shown at 186b (Fig. 5) which with a detail film in cooperation therewith will effect closure of contacts 186ba. Light film detecting levers are provided for the other detail films, these being shown on the circuit diagram (Fig. 17b). 186a cooperates with the 120a detail film, 186b cooperates with the 120b detail film and 186c cooperates with the 120c detail film, the related contacts 186aa, 186 ba and 186ca. It may be stated that the general purpose of these film detecting levers is to maintain the machine in operation with films in place and to stop the operation of the machine should one or more of the films break or become exhausted.

Referring to Fig. 17b of the circuit diagram, provision is made whereby the contact control can be brought into place for one or more of the detail films. Plug sockets 187, 188 and 189 are provided with another plug socket 190. By placing a plug connection 191 in socket 190 and socket 187, all three of the detail film levers will be in controlling relation and by shifting the plug connection 191 to socket 188, the 186ca contacts will be out of circuit and so on. In this way, the film lever control can be changed depending upon whether one, two or three detail films are to be fed.

As a preliminary starting up operation it is desirable that all parts of the machine be brought back to an assured home starting position. This is brought about in the following manner: Main line switch 200 (Fig. 17c) is first closed, providing current supply to the main brushes 201 and 202. Switch 248 (Fig. 17b is opened, i. e., in the dotted line position. Special key 246 (Fig. 17b) is depressed providing a circuit from line 202 through coil 247, through key 246, through magnetic clutch 52 to line 201. The motors 51 and 53 are now in operation. With magnetic clutch 52 energized, a drive is provided for motor 51 through the clutch 52 to main shaft 50 (see also Fig. 1). With coil 247 energized, contacts 247a Fig. 17c) close and cause energization of clutch magnet 67. Contacts 247b, 247c and 247d (Fig. 17b) are also closed at this time to energize shutter clutch magnets 136a, 136b and 136c. With clutch magnet 67 energized, a drive is now provided to shaft 74 (Fig. 1) through the gears 67a, 69 and 73. Shaft 74 will rotate and bring all the cams 75 to 83 and 87 to home position if any of them are away from home position prior to this preliminary operation. The energization of 136a, 136b and 136c will cause the various associated clutches such as 134a, 134b and 134c (Fig. 5) to be tripped whereupon the gears 133a, 133b and 133c will rotate through several revolutions to bring the detail film three to one cams such as 142a, 142b and 142c, back to home position. Drive is also provided through gears 57, 56 and 73a to shaft 74a. Shaft 74a will rotate and bring all the cams 84 to 86 to home position if any of them are away from home position prior to this preliminary operation.

The machine is now in condition for starting a series of operations and before these operations are started the switch 200 (Fig. 17c) is open and switch 248 (Fig. 17b) is re-closed to a full line position.

*Circuit diagram and general operation*

It will be assumed that thereafter the master film has been placed in position and threaded through the machine and that three detail films are in position on their respective rolls and properly threaded.

The first operation to be explained will be that of printing data from every frame of the master film to each of the three detail films and to imprint one imprint on each detail film. Under this condition the plug connection 191 (Fig. 17b) will be made from socket 190 to socket 187. Control magnet 192 will then be in series relation through all the film control contacts of all the detail films and of the master film.

Inasmuch as the shutter action and the film feed must be provided for all three detail films, certain plug connections are made in order that the shutters operate at the proper time and the detail films are fed and clutched up at the proper time.

Referring to Fig. 17a, a plug connection is made from socket 193 to socket 194 which plug connection provides for the proper shutter action and film feed for the 120a detail film. To provide for the shutter action and film feed of the 120b detail film a plug connection is made from socket 195 to socket 196 and to provide the control for the 120c detail film a plug connection is made from socket 197 to socket 198. The operator of the machine now closes a main line switch 200 (Fig. 17c) providing current supply to the main buses 201 and 202. With current supplied to these buses, current supply is also afforded to the driving motors 53 and 51. The operator now depresses start key 203 (Fig. 17b). This completes a circuit from the 202 bus, through the start key contacts to energize relay coil 204. With this magnet thus energized, a stick circuit is completed through relay contacts 204a, through the stop key contacts 205 and through now closed relay contacts 192a, such contacts being closed because of the energization of magnet 192 in the manner previously explained. Energization of relay coil 204 also effects closure of relay contacts 204b and a circuit is completed from the 202 bus, through the 206a contacts now in the position shown to energize the electromagnetic clutch 52 (see also Fig. 1). With the electromagnetic clutch 52 energized, motor 51 is clutched to the main drive shaft 50. With relay magnet 204 energized, contacts 204c (Fig. 17c) are closed and current supply is provided to clutch magnet 67, the circuit being completed through contacts 205b and F—9 now in the position shown. With clutch magnet 67 energized, shaft 68a is clutched to the main drive shaft 50 (see Fig. 1) and drive is provided from shaft 50 to shaft 74. Feed of the master film now starts and several synchronizing spots on several of the master film frames traverse the reading station. As each synchronizing spot passes through the reading station, the synchronizing light sensitive cell 105a (Fig. 17c, see also Fig. 16) is activated. As is customary with photo-electric cell practice, an amplifier unit 207 is provided which contains its own current supply as by batteries and which amplifying unit is provided with a relay coil 208 which becomes energized upon the activation of the light sensitive cell 105a. Every time relay coil 208 is energized, contacts 208a become closed and current supply is afforded to the synchronizing magnet 181. When the synchronizing magnet 181 is energized, contacts 181a are closed. Shortly after the synchronizing magnet 181 becomes energized, it is deenergized by the opening of cam contacts CC—6. With magnet 181 energized, contacts 181b are closed, energizing relay 249 which is held energized by stick contacts 249a, the stick circuit going back to line through F—8. With 249 energized, the contacts 249b open to open the circuit to photo cell 105a and de-energize relay 208.

Upon closure of cam contacts CC—7 (Fig. 17a), which contacts close for each feed of the master film frame, relay coils 209, 210 and 211 will become energized, current supply being afforded from the plug connections 193 to 194, 195 to 196 and 197 to 198. With relay coils 209, 210 and 211, stick contacts 209a, 210a and 211a become closed and a stick circuit is established to maintain the coils 209, 210 and 211 energized, the stick circuit extending back to line through cam contacts CC—3. Energization of relays 209, 210 and 211 also closes relay contacts 209b, 210b, 211b, 209c, 210c and 211c and 209d, 210d and 211d and current supply is afforded to energize cam clutch magnets 75A, 76A and 77A. Cam contacts 75—77d are now in the position shown so that this group of cam clutch magnets can be energized.

At a determined time in the film feed cycle rotation of the cams 75, 76 and 77 starts (see Figs. 13 and 18a). Cam 75 starts to rotate at the 14 index or time point in the first cycle delineated on the timing diagram (Figs 14a and 18a). Relay contacts 75—77d shift at the indicated point in the second cycle. Near the end of the second cycle, cam contacts CC—3 open (see Fig. 34) and upon the opening of such cam contacts relay coils 209, 210 and 211 become de-energized, thereby opening relay points 209b, 210b and 211b. Contacts 75—77d will have reached shifted position at the time the 209b, 210b and 211b contacts re-open (see Fig. 18a) and towards the end of the second cycle (see Fig. 33) cam contacts CC—7 close to re-energize relay coils 209, 210 and 211. With such coils re-energized and inasmuch as the 78—80d contacts are in the position shown, the cam clutch magnets 78A, 79A and 80A will become energized and their related cams brought into operation. In the third cycle (see Fig. 18a) the contacts 78—80d shift to prevent re-energization of 78A, 79A and 80A and permit the energization of the 81A, 82A and 83A magnets in the third cycle to clutch in 81, 82 and 83 at the time shown in the timing diagram (Fig. 18a). Contact cams 75, 76 and 77 after commencing to rotate, rotate through three frame cycles (see Figs. 14a and 18a) and during the number 4 frame cycle as shown on the timing diagram, the contacts 75b close (see Figs. 14, 14a and 17b), likewise the contacts 76b and contacts 77b close at this time. The closure of 75b, 76b and 77b cause the energization of the shutter clutch magnets 136a, 136b and 136c. The closure of relay contacts 136ab, 136bb and 136cb bring about the energization of relay coil 206 upon the closure of cam contacts F—7. With shutter clutch magnets 136a, 136b and 136c energized, film feed of the three detail films 120a, 120b and 120c takes place through Geneva drives previously described. The drive of the various detail films starts at high speed, but after high speed drive is initiated the film drive is shifted from high speed to slow speed so that the final film feed is relatively slow. Slow speed drive is brought about under the control of relay coil 206, 206 becoming energized later than the energization of 136a, 136b and 136c during the timing of cam contacts F—7. With 206 energized stick contacts 206c close providing a stick circuit for relay coil 206, through cam contacts F—1.

Referring to Fig. 17b, with relay coil 206 energized, relay contacts 206a will shift to reverse position from that shown on Fig. 17b and accordingly, with such contacts shifted electromagnetic clutch 52 will become de-energized, cutting off the high speed drive (see Fig. 1) and electromagnetic clutch 54 will become energized. With electromagnetic clutch 54 energized, the drive for shaft 50 will be a low speed drive from driving motor 53. With relay coil 206 energized, as above described, relay contacts 206b (Fig. 17c) will become open and de-energizes the master film feed clutch 67 so that drive of the master film will be terminated at the end of the cycle.

It will be understood that the master film moves concurrently with the detail films and that the master film frame has its position adjusted by the synchronizing means before its movement stops with the frame at the reading position and furthermore with the detail films moved first rapidly and then at a slower rate and finally come to rest and that at the time such films are at rest, the shutter action occurs and printing takes place.

Having completed one exposure, further operations are initiated in the following manner: Relay coil 206 (Fig. 17b) is maintained energized until after the exposure time in the projecting and exposing cycle and is subsequently de-energized at the time shown in the timing diagram (Fig. 33) for cam contact F—1. When cam contact F—1 interrupts the stick circuit for relay 206, relay contacts 206b re-close and one revolution clutch magnet 67 is re-energized at the time F—9 closes, bringing about a re-start of the feed of the master film. During this feed cycle, magnets 78A (Fig. 17d), 79A and 80A are energized in the manner previously explained and their energization has caused corresponding motion of the cams 78, 79 and 80. These cams in turn, during their cycle of operation, ultimately close the 78b contacts (Fig. 17b), the 79b contacts and the 80b contacts. Such contacts on closing, re-energize the magnets 136a, 136b and 136c and the detail film feeding actions and shutter actions take place as before so that the next frame of the master film is printed on each of the detail films. A further and third action occurs for the following frame of the master card. This further action is initiated by the 81b contacts, the 82b contacts and the 83b contacts. The operations continue to print frame after frame of data from the master film to the detail films. At any time in the run of the various films through the machine, operations may be terminated by depressing a stop key shown on Fig. 17b and opening the stop key contacts 205. The opening of such contacts will de-energize relay 204 and with 204 de-energized, the 204b contacts are open and the electromagnetic clutches 52 and/or 54 are both de-energized. The de-energization of 204 also opens the 204c contacts (Fig. 17c) and de-energizes the main clutch magnet 67, thereby terminating the film feed of the master film. In the event that any of the detail films become exhausted or in the event that one of the detail films inadvertently breaks one of the film lever contacts 186aa, 186ba, 186ca will open and de-energize 192. This relay will also be de-energized if the master film should break or become exhausted which would open contacts 185a. With 192 de-energized, the 192a contacts will re-open and cause de-energization of 204 whereupon stoppage of operation would ensue as before described for a stop key stoppage of operations.

Fig. 18a shows the timing relation of various operations and shows the succession of cycles which take place when the machine is operating to perform the operations shown on Fig. 18.

The foregoing description has described a relatively simple printing operation wherein data from the master film is imprinted on all three detail films. If it is desired to suppress printing on say the 120b film (see Fig. 19), a plug connection would be left out between 196 and 195 (Fig. 17a). To suppress on the 120c film, the plug connection would be left out from 197 and 198. To suppress printing on the 120a film, the plug connection would be left out from 194 and 193. Obviously one, two or three plug connections can be employed, depending upon which films printing is to be effected. Obviously, if a less number of films are being printed upon the plug connection 191 (Fig. 17b) would have to be adjusted to a different relation. If printing is desired on the 120a film and the 120c film, but not on the 120b film, a plug connection would be made from socket 188 to 189 to shunt the 186b contacts. If not on the 120a film a plug connection would be made from 189 to 189a.

When the operation shown in Fig. 19 is being performed the general timing relations are as shown in Fig. 18a, except only the 209 and 211 relays will be effective because of the omission of a plug connection between 195 and 196. Accordingly relays 75A and 77A, 78A and 80A and 81A and 83A only will be effective. Also cams 75 and 77, 78 and 80 and 81 and 83 only will be operative. Shutter cams 137a and 137c will only be effective.

When the operation shown in Fig. 20 is being performed with plug connections omitted between 193 and 194 and between 197 and 198 (Fig. 17a) the machine will operate in the general time relation shown on Fig. 18a, except that relay 210 only is energized. Relays 76A, 79A and 82A will be effective. Also cams 76, 79 and 82 will be operative and shutter cam 137b will be effective.

The machine operation will now be described, wherein control number data is read from the master film and compared with control number data on one of the setup devices related to a detail film and wherein data from the master film is printed upon such related detail film in the event of an agreement of such control numbers, i. e., in the event that the control number on the master film agrees with the setup control number (see Fig. 21). It will be assumed that the setup device 64c, related to the 120c detail film, is set up for a control number of 10. With this set up, a plug connection would be made from socket 215 (Fig. 17a) to socket 216 and a plug connection would also be made from socket 217 to 218. A plug connection will also be made from socket 197 to socket 219, and another plug connection will be made from socket 220 to 198. The machine is then started in operation as before, by pressing the start key 203 and closing the start key contacts, energizing relay contacts 204. Film feed of the master film occurs as before and as the control zone of the master film passes the reading station, the photo-sensitive cells 105 become biased at the differential time that a light control spot passes the reading aperture and such biasing of the photo-sensitive cells through the amplifier units generally designated 221 brings about corresponding energization of the 222u (unit order relay) and the 222t (tens order relay) at the corresponding differential time in the cycle.

It will be assumed that the spots on the control zone of a particular frame represent 10. Relay coils 222u and 222t upon being energized cause closure of their related contacts 222uC and 222tC. The related 222u and 222t coils will become energized provided matching current impulses come to these coils from the emitter 63 through the setup devices 64c. Such matching impulses flow by the plug connections previously described to the auto-control comparing controls 223t and 223u. If the impulses which are received by such coils from the emitter are received at the time relay contacts 222uC and 222tC are closed, the coils for the two orders will become energized and contacts 223uA and 223tA will become closed. This will allow energization of coils 224u and 224t. Such coils upon becoming energized remain energized because of the closure of the stick contacts 224a, etc. The stick circuit extends back to line through cam contacts CC—1.

Energization of coils 224u and 224t also close contacts 224ub and 224tb and upon closure of cam contacts CC—7 an auto-control circuit is established from the 201 side of the line, through CC—7, from 197 to 219, thence through the closed 224tb and 224ub contacts, through the plug connection of socket 220 to socket 198 and the current supply provided through this path will energize relay coil 211. Energization of 211 will close contacts 211b and energize cam clutch magnet 77A. This will clutch up the 77 contact cam which later in its revolution will close the contacts 77b, which contacts upon closure, energize the detail film feed and shutter clutch magnet 136c. The operations now follow as before, that is, the 120c film is fed. Its shutter is tripped and it is exposed and printing effected of the data from the master film.

The above operation has described a matching or comparison of control data from the master film to the hand setup device 64c. In the event that the data read from the master film did not compare with the setup, for example, suppose 4 was read from the master film, the aforementioned auto-control circuit would not be energized, because one or the other or both of the 224ub or 224tb contacts (Fig. 17a) would not be closed so that the initiating circuit to the 211 relay would not be completed. Under this condition, there would be no feed of the 120c film at all.

If it be desired to print upon the a or b films it will be understood that setup control numbers can be placed also on the 64a setup device and the 64b setup device. If setup device 64b for the 120b film is to be used, plug connections would be made from the sockets 255 to the related sockets 226. A plug connection will also be made from sockets 195 to one of the sockets 227 depending upon the number of orders controlled which is set up, and 228 to 196. Then upon a matching comparison relay coil 210 would be energized and the 120b film would be fed and exposed. Likewise if a setup is to be made on the 64a section, plug connections would be made from the 229 group of sockets to the 230 group of sockets and plug connections would also be made from socket 193 to one of the sockets 231 and from socket 232 to 194. This would bring about an energization of relay 209 if the control numbers from the film match the setup control number.

Figure 21A:
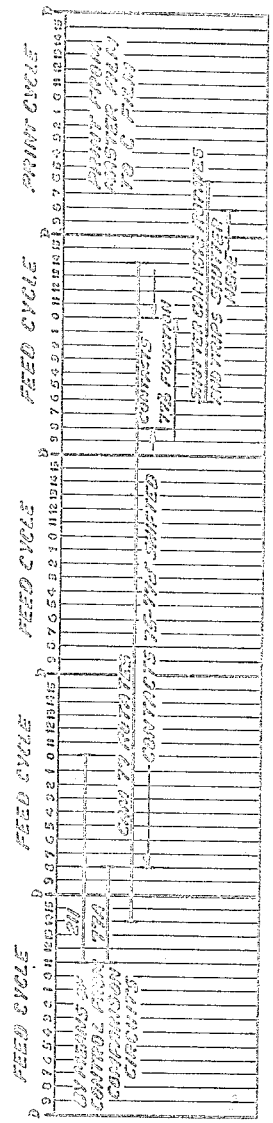

Fig. 21a shows the timing diagram of the machine when operating to perform the operation shown on Fig. 21.

The operation wherein more than one control unit is plugged up to one or more setup devices, refers to the diagrammatic operation of Fig. 22. To prepare the machine to operate and secure the results shown on Fig. 22, plug connections are made between 230 and 229 sockets and between the 226 and 225 sockets (Fig. 17a) and from 193 to 231, 195 to 227, 232 to 194 and 228 to 196 and from 190 to 188. On the hand setup devices 64a and 64b the control number of 3 is set up. When a frame of the master film shows a control number of 3 the auto-control coils 224u in the A and B control section will be energized. Contacts 224ub will close, allowing relays 209 and 210 to energize. There is also an energization of 75A and 76A so that cams 75 and 76 rotate. Shutter cams 137a and 137b also operate whereupon printing from the master film is effected, upon the a and b films. The timing relations for most of an operation are shown in Fig. 22a.

Figure 23A:
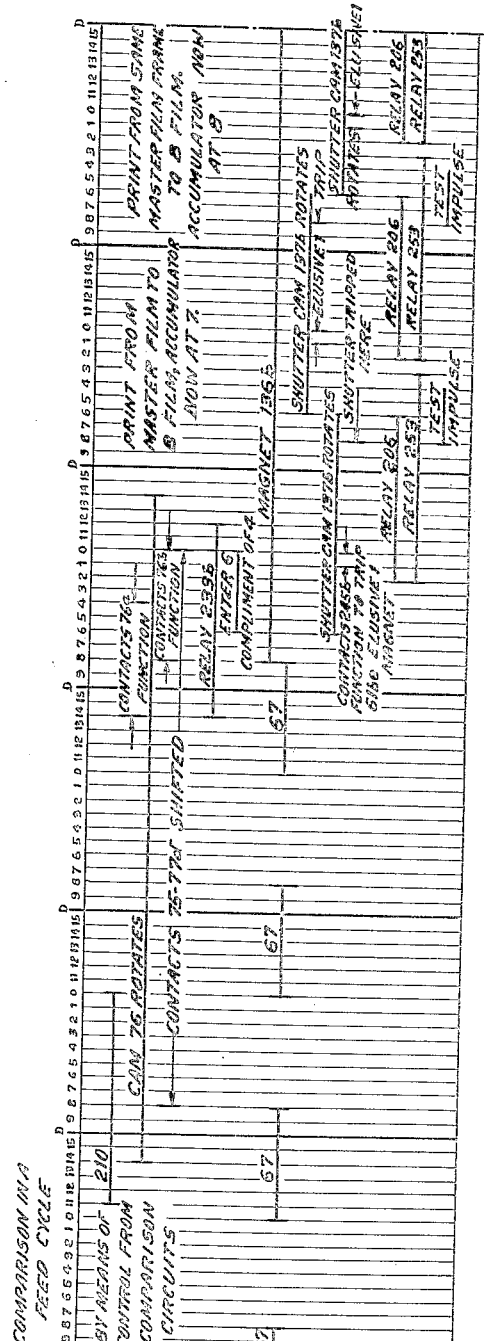

An operation will now be described wherein data derived from the master film is printed more than once on say one detail film (see Fig. 23). It will be assumed that data from one frame in the master film is to be repeated four times on the 120b detail film in four successive frames thereof. For this type of operation the 64Rb setup device (Fig. 17b) related to the 120b film, will be set to the four position. The segment spots of the 64Rb setup device are wired to an emitter 63a in tens complementary relation, that is to say, an impulse will be emitted through the 4 spot upon the 6 index point of time in the cycle of operation. To provide current supply for emitter 63a, a plug connection is made intermediate sockets 235 and 236 and the emitter 63a receives current during the period of closure of cam contacts CC—9. For this type of operation, plug connections are also made between sockets 237 and 238 and between sockets 239 and 240 (Fig. 17b). Plug connections are also made from socket 241 to socket 242. With the above plug connections made and the machine started into operation, the 76A cam clutch magnet will be energized under the initiating influence of the auto-control circuit (see Fig. 23a) and cam 76 during its rotation and before it energizes the detail film feed and shutter clutch magnet 136b will cause closure of cam contacts 76a (Fig. 17b). Closure of cam contacts 76a will energize relay coil 233b and close relay contacts 233ba. Then, upon operation of the emitter 63a, an impulse will be emitted at the 6 index point of the cycle, through the 4 segment of the 64Rb setup device, thence via the brush to the collector ring and out through the contacts 233ba to the accumulator magnet 61b. This will enter 6 in one of the orders of such accumulators. It may be mentioned that the 233b relay coil is held energized, through stick contacts 233bb, the stick circuit extending back to line through cam contacts CC—8. This stick circuit is maintained long enough to allow 6 to be entered into the 61 accumulator. Each of the shutter cams are adapted to operate contacts such as 245a, 245b and 245c. Inasmuch as the 120b film is being operated upon, the 245b contacts will close, energizing an elusive one magnet 61be (see magnet 148 in Lake and Daly Patent No. 1,976,617). The effect of the energization of this magnet is to add one into the related order of this accumulator each time the shutter mechanism operates.

Four printing operations then ensue and at the completion of the fourth printing operation the accumulator will be brought back to zero, it being remembered that a value of 6 was originally entered into it so that with four single 1 or elusive 1 entries made the accumulator, after the fourth printing operation, will be back at zero. Provision must be made to hold shutter clutch magnet 136b energized for a total of four cycles. This is provided for in the following manner: When shutter clutch magnet 136b is energized the first time in a manner previously explained, stick contacts 136ba will close and a stick circuit will be provided for 136b, which sticks circuit includes the following circuit path: From 136ba, through 251a normally closed, through 290c normally closed, through plug connections from 237 and 238 and back to line 201. During printing operations, relay 206 becomes energized in the manner previously explained. With such relay 206 (Fig. 17b) energized, relay contacts 206e (Fig. 17c) become closed and cause energization of relay coil 253. A stick circuit for relay coil 253 is provided through stick contacts 253a, the stick circuit being completed back to line through cam contacts F—6. With relay coil 253 (Fig. 17c) energized, relay contacts 253b (Fig. 17) become closed. With such contacts closed and upon closure of cam contacts F—5, a circuit is completed from line 202, through the plug connection from socket 242 to 241, through the 253b contacts, through the F—5 contacts, up to the common strip on the units order of the accumulator readout, through the brush of this readout which stands at zero and to the 251 magnet and back to the other side of the line. It will be understood that this circuit, which ultimately energizes 251, does not become completed until the accumulator is back to zero in the units order, which occurs after four repeat printing operations in the manner previously explained. With 251 energized, contacts 251a (Fig. 17b) open, breaking the stick circuit for the shutter clutch magnet 136b so that further exposing operations are terminated.

An operation of the machine will now describe where printing is effected on one detail film, for example, the A film on one matching comparison. Where printing is effected on two films, for instance the A and B detail films on a single comparison and where printing is effected on three films, viz., the A, the B and the C detail films on still another comparison operation. This is the operation diagrammatically indicated in Fig. 24. For this type of operation, the hand setup device 64a is set up to say the digit 9 in the units order. The 64b setup device is set up for the digit 7 in the units order and the 64c setup device is set for the digit 4 in the units order. This particular setting, it will be understood, matches the showing on the diagrammatic view (Fig. 24) and obviously other control values could be selected. A plug connection is made from socket 193 (Fig. 17a) to the left hand one of the 231 sockets. Another plug connection is made from socket 195 to the left hand one of the 227 sockets and another plug connection is likewise made from the socket 197 to the left hand one of the 219 sockets. A plug connection is made from 254 to 255 and from socket 256 to 257, and from 220 to 198; from 232 to 194 and from 228 to 196.

If a spot on the master film matches the setting of the 64a setup device, relay coil 209 will be energized in the manner previously described.

It will be understood that there are auto-control coils such as 223 and 224 for each of the various setup devices 64a, 64b and 64c and upon energization of the 224 coil of the A group in the control unit, 224ub contacts of the A control unit close, providing a circuit from line 201, through CC—7, through the plug connection from 193 to the left hand 231 socket, through the 224ub contacts, through a plug connection from socket 232 to 194 through relay coil 209 and back to the other side of the line. With relay coil 209 thus energized, 209b, 209c and 209d will close and printing will be brought about on the A film in the manner previously explained. If, however, a 7 spot on the master film traverses the reading opening, under this condition the auto-control unit will energize magnet 210. The energizing circuit for 210 is from line 201, through CC—7, through socket 195, through the left hand socket of the 227 group, through the 224ub auto-control contacts, to socket 228 to socket 196, and thence through relay coil 210 and back to line. With 210 energized, contacts 210e will close and when CC—2 close a circuit is completed from line 201, through CC—2, 210e, from socket 254, through 255 to energize magnet 209. Under this control just described, both 209 and 210 are energized so there will be printing brought about on both the A and the B detail films. If on the other hand the amount on the master film represented the digit 4, which corresponds to the setup on 64c, 211 would be energized and upon energization would close 211e and 211f whereupon magnets 209 and 210 would be energized as well as magnet 211. This would bring about a printing on the A, B and C detail films of the amount derived from the master film.

Figure 24A:
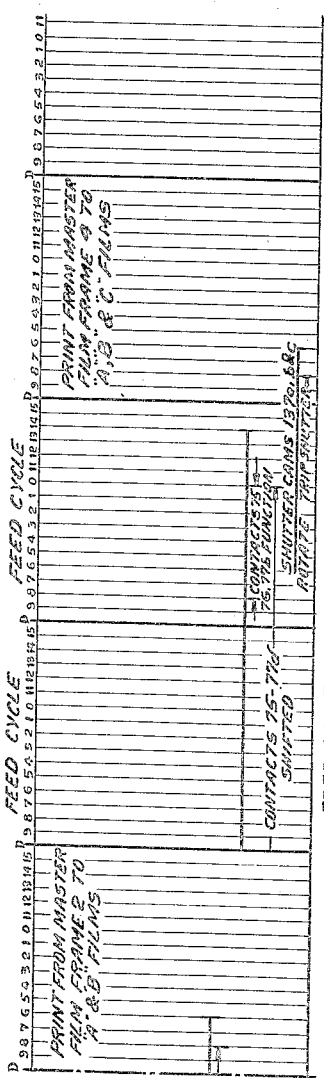

The timing relations for the machine when operating to perform the results shown in Fig. 24 are shown in Fig. 24a.

Referring now to Fig. 25, printing will be effected upon all detail films except the ones wherein the setup device compares to the control spot on the master film, that is to say if the setup device for the A film is set up to say 6, and a 6 control spot comes along on the master film, there will be no printing whatsoever on the A film, but printing on the master film will go to both the B and C films. Similarly, if the B setup device was set up to say a control number of 9 and a 9 control spot came along on the master film this frame on the master film would not be printed on the B detail films but would be printed on the A detail film wherein the control setup was 6 and likewise the frame would not be printed on the C detail film wherein the setup control number was also 9 which matches the control spot on the detail film.

Figure 25A:
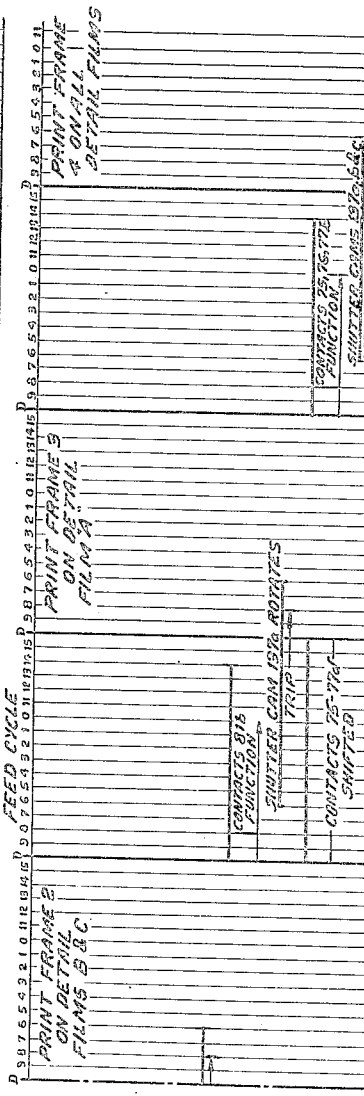

Referring now to Fig. 17a, the 64a setup device would be set to 6 and the 64b and 64c setup devices would be set to 9. For this type of operation, plug connections would be made from 193 to 231, from 195 to 227 and from 197 to 219 as before. Plug connections will be made from socket 232 to socket 258, from 228 to socket 259 and from 220 to 260. Plug connections will also be made from 261 to 194, 262 to 196 and from 263 to 198. With plug connections made as aforesaid in the event of a comparison through 264, 265 or 266 will become energized depending upon where the comparison occurs. In certain cases both 265 and 266 will become energized, particularly in the case under consideration where 9 is set up in setup devices for both the C and B detail films. Let us assume that 264 becomes energized. Under this condition relay contacts 264b open and the opening of these contacts will prevent an energization of relay coil 209 so there will accordingly be no printing effected on the A detail film under this control condition. The other initiating controls for the other two films will be energized because 262 is plugged to 196 and contacts 265b are not opened under this control condition. Likewise since 263 is plugged to 198 and contacts 266b are not opened under this control condition there will be an energization of 210 and/or 211, as the case may be. Fig. 25a shows the timing of the machine for the operations shown in Fig. 25.

Referring now to Fig. 26, in this operation, if the A device is set up with a control number which matches the control spot on the master film there is omission of printing on the A film. On the other hand, if the B control device is set up with a control number to match a control spot on the master film there is omission of printing on the A and B detail films. On the other hand, if the C setup device is set up for a control number which matches the control spot on the master film, there will be omission of printing on all three detail films.

In explaining this type of operation it will be assumed that the setup devices are set up with the control numbers as per Fig. 26, that is 3 will be set up on the 64a setup device (Fig. 17a), 9 will be set up on the 64b device and 4 will be set up on the 64c device. For this type of operation the plugging will be as follows: A plug connection will be made between 193 and the left hand 231 socket and from socket 232 to 258. Another connection will be made from socket 195 to the left hand 227 socket and a connection will be made from 228 to 259. Likewise a connection will be made from 197 to the left hand 219 socket with a further connection from the 220 to 260 socket. A connection will be made from 261 to 194 and from 262 to 196 and from 263 to 198. Connections will also be made from 267 to the other 258 socket, with a like connection from the 268 to the supplementary 259 socket. Under this condition of operation, printing will occur on all three of the detail films A, B and C until a comparison occurs between the control spot on the master film and the set up control amounts on any one of the setup devices. This will be the case, since on each operation on the closure of CC—2 there will be an energization of all three of the initiating relays 209, 210 and 211. For example, it may be explained that the 264b contacts are closed until a comparison occurs and in view of the plug connection between 261 and 194, there will be an energization of 209 upon the closure of CC—2. Likewise since 265b are normally closed until a comparison occurs and in view of a plug connection between 262 and 196, there will be an energization of 210 upon each closure of CC—2. Likewise the 266b contacts normally close until a comparison occurs and in view of the connection between 263 and 198 there likewise will be an energization of 211 upon each closure of CC—2. However, assume that a comparison occurs between the control spot on the master film and the amount set up on the 64a setup device. Under this condition of operation the above described initiating circuit through the 264b contacts is interrupted so that there is accordingly no energization of 209. The set up of the comparison control, i. e., the manner of energizing 264 in the event of a comparison need not be here repeated since it has been previously described.

Printing will, however, occur on the B and C detail films because their comparison control contacts 265b and 266b have not opened under this condition. Assume, however, that the control spot on the master film compares with the amount set up on 64b. Under this condition of operation, when comparison occurs, magnet 265 will be energized in the manner previously explained. Energization of 265 will cause opening of contacts 265b and there will be no energization of 210, since the initiating circuit which extends from socket 196 to 262, through 265b is opened at the 265b contacts. Under this condition of operation, however, contacts 265c will be closed and in view of the plug connection from 267 to 258 there will be an energization of 264, which in turn will cause opening of the 264b contacts before CC—2 closes so that the initiating circuit to magnet 209 will be broken. Accordingly, there will be no printing on the A film as well as on the B film. Printing under these conditions will, however, take place on the C film through the 266b contacts which are closed under this condition and through the circuit extending from 263 to 198 which will bring about an energization of 211 and cause printing on the C film.

Figure 26A:
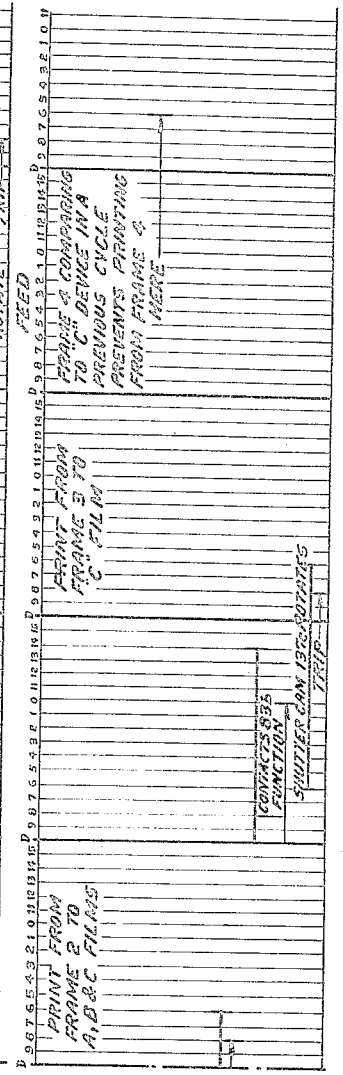

Now let us consider the operations when there is a comparison beyond the control spot on the master film and the 64c setup device. Under this condition the operation will be as in the manner previously explained when a comparison occurs the magnet 266 will be energized. Energization of 266 will cause opening of contacts 266b and accordingly there will be no energization of magnet 211 and accordingly there will be no attendant printing on the C film. The energization of 266 under this condition will also cause closure of the 266d contacts and the 266c contacts and with these contacts closed and in view of the plug connections from 268 to 259 and from 267 to 258 there will be an energization of 265 and 264 respectively, whereupon the 265b contacts and the 264b contacts are open at the time CC—2 closes so that there will be no energization of 210 and 209 with no attendant printing on the A and B films. Fig. 26a shows the timing for performing the operations shown on Fig. 26.

Referring now to Fig. 27, this type of operation in substance may be described as follows: The entry of data from the master film to one or more of the detail films can be effected in any of the manners previously described. However, with this type of operation, provision is made for printing additional data on one or more of the detail films which additional data is derived from hand setup devices in the machine. With this type of operation the additional data derived from such hand setup devices may be additional data which supplements the printed data derived from the master film and/or as diagrammatically illustrated in Fig. 27, a part or all of the data derived from the master film may be blocked out and prevented from being printed on a particular detail film or films and in its place there can be printed on one or more of the detail films data derived from the hand setup device or devices.

In this type of operation the printing on the detail film from the hand setup device will be generally referred to as duplicating to accord with terminology in the statistical machine art. Due to the constructional relation of the parts of the machine the duplicating printing section is located several frames, in fact two frames, beyond the master film printing station. In view of this construction, provision must be made to defer duplicating for two frame cycles after the printing takes place from the master film. It will be understood, however, that after starting up the machine a duplicating printing operation may take place on one frame while a printing from the master film is taking place concurrently on a frame two positions away from the frame receiving the duplicating printing.

A duplicating operation will now be particularly described with reference to the typical problem shown in Fig. 27.

Figure 27A:
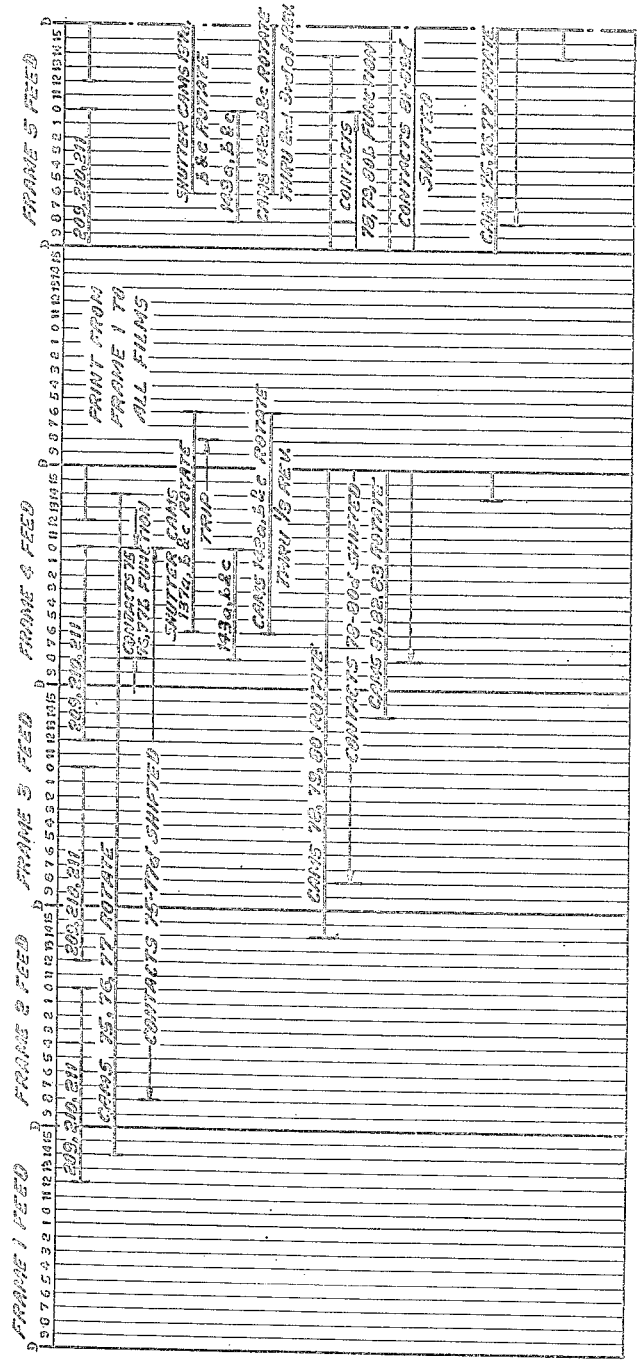

Fig. 27a shows the timing relation of the various parts of the machine and the succession of cycles for the machine when the machine is performing the general type of operation shown in Fig. 27.

Referring to Fig. 27, it will be here seen that the masking out involves the blocking out of the last column as derived from the master film on the A and B detail films, whereas on the C film, the masking out is in the middle column. It will be further seen that the duplicating operation on the A film involves the introduction of the numeral 4 into the last column. To obtain this set up for duplicating on the A film the setup device shown in Fig. 8 and at the top of Fig. 7 is adjusted to set up 4 in the units order.

Referring now to the B film, the duplicating figure here is the numeral 6 and 6 is set up on the setup device shown on Fig. 9 and to the right in Fig. 7.

Referring now to the C detail film the duplicating number to be introduced on the film is the numeral 5 and accordingly 5 is set up in the tens order of the device shown in Fig. 8 and at the bottom of Fig. 7.

In order to mask out the to be masked out data on the detail films, the operator of the machine selects the proper masks 182 (Fig. 15) and takes two masks with the barrier portion 182a in such relation on the mask as to block out the units order column. These two masks 182 are inserted through 183 (Fig. 5) into the guide slots 184a, and 184b (see Figs. 10 and 7). Another mask 182 with its barrier portion 182a in such position as to block off the middle column or tens order column is inserted in the 184c slot. For a duplicating operation the following special plugging connections are made.

Referring to Fig. 17c, plug connections are made between 270 and 271, between 272 and 273, between 274 and 275 and between 276 and 277.

The operator also sets up the machine to print in any one of the previously described manners from the master film. Under this type of operation one or more of the detail film feed clutch magnets 136a, 136b or 136c (Fig. 17b) become energized in the regular manner. The energization of magnet 136a causes the closure of contacts 136 ac (Fig. 17c), and 136b causes closure of 136bc, and 136c causes closure of 136cc.

In view of the plug connections previously mentioned between 270 and 271, 272 and 273, 274 and 275, the closure of 136ac, 136bc and 136cc will bring about energization of 143a and/or 143b and/or 143c depending upon the kind of printing to be effected. The energization of any one of the 143 magnets, i. e., 143a, 143b or 143c will cause the related clutch unit (Fig. 5) to be brought into operation and cause rotation of the corresponding 142 cam. Each of the 142 cams is driven from the related shutter clutch and the drive relations are such that three revolutions of a shutter clutch are required to make one revolution of the 142 cam. The shutter clutch comes into operation at the beginning of detail film feed and accordingly cam contacts associated with the 142 cam can be caused to close several frames later on after detail film feed commences. Thus let it be assumed that the 136a shutter clutch be energized. To describe the timing sequence for duplicating operations, let it be assumed that a detail film frame at the beginning of operations be below the master printing station, that is below 119b (Fig. 5). Now let it be assumed that the detail film feed is clutched up. One cycle of operation will be required to bring this film to the master film printing station. When in such master printing station, the film is exposed, thereafter a further cycle is required to feed the same detail film frame to an intermediate station between the master printing station and the duplicating station and a further cycle is required to bring the same frame to the duplicating station. It will therefore be appreciated that three cycles of operation beginning at the beginning of detail film feed, are required before the particular frame of the detail film reaches the duplicating station after it has commenced to move from the station below the master printing station. This accounts for the three to one drive ratio for driving the 142 cams. In short, it is sufficient to state that from the beginning of detail film feed, three frame feeding cycles elapse before the contacts controlled by the 142 cam are closed. It may be stated that the contacts controlled by 142 close before the actual shutter mechanism is tripped (see Fig. 5a).

It may be assumed that contacts 143a—1, 143b—1 and 143c—1 all close concurrently (Fig. 17c). There will be accordingly, a concurrent energization of relays 280, 281 and 282, and each of these relays upon being energized is retained energized by the closure of stick contacts 280a, 281a, 282a, the stick circuits being completed through normally closed cam contacts 84b, 85b and 86b. Relays 280, 281 and 282 upon energization, bring about closure of their respective related contacts 280b, 281b and 282b and these contacts upon closure bring about illumination of lamps 150a, 150b and 150c (see also Fig. 7). To deenergize the 143a, the 143b and the 143c magnets and prevent further energization thereof, these magnets become de-energized at the time magnets 280, 281 and 282 were energized by means of the 280c, 281c and the 282c contacts becoming open. The illumination of these lamps 150 provides for illumination of the setup slides for the set up data (see Fig. 6 for example).

In the sequence of operation of the machine, the shutter mechanisms 124a, 124b and 124c are tripped in the manner previously described. It may be mentioned that these shutters are tripped simultaneously with the tripping of the other shutters in the master film printing station. When the last frame of a master film has been printed, it will be understood that supplemental cycles must ensue before this last frame can receive duplication data. The means to provide such extra cycles will now be described.

In order to appraise the machine that a particular frame of the master film is a last frame, a mark is placed in one of the columns of the master film at a point above and following the numerical data. Expressed according to statistical machine terminology, this mark is placed in one of the extra index point positions above the zero positions. It may be conveniently placed in the 11th index point position. When the light sensing means senses such extra mark, it brings about closure of one or another of the 222thd contacts, the 222hd contacts, the 222td contacts, 222ud contacts (Fig. 17a) depending on the column where this extra mark appears. It will be assumed, for example, that the extra mark is placed in the units order column and under this condition, the 222ud contacts would become closed. Under this condition, relay 285 would be energized and this relay when energized would be maintained energized by stick contacts 285, the stick circuit going back to line through cam contacts CC—10. It will be understood that in place of 285 being energized, 286, 287 or 288 might have become energized, depending upon the position of the extra last column frame marked and each of these other relay magnets would have similar stick contacts.

Referring now to Fig. 17c, and remembering that there was a plug connection between 276 and 277, the energization of 285 will cause closure of contacts 285b and bring about energization of clutch magnet 87A. Energization of 87A (see Fig. 32 and Fig. 32a) will clutch up its related cam 87. Cam 87 comes into operation during comparing cycles and three comparing cycles ensue. Ultimately cam contacts 87a (Figs. 32 and 32a) close and closure of these contacts (see Fig. 17c) causes energization of clutch magnets 84a, 85a and 86a (see Figs. 31 and 31a). The energization of these clutch magnets 84a, 85a and 86a clutch up the cams 84, 85 and 86 and these cams are started into operation at the end of the third comparing cycle. During the immediately following cycle, the 84a contacts, the 85a contacts, the 86a contacts and the 84c contacts close (see Figs 31 and 31a). The 84c contacts in closing (see Fig. 17c) energize relay 290, which relay is maintained energized by stick contacts 290a, the stick circuit going back to line through cams F—4. Relay 290 upon being energized, opens contacts 290b (Fig. 17c), cutting off the illumination to lamp 107 in the master film print unit, thereby suppressing further printing from the now master film. It may be mentioned that contacts 84c close before contacts 84a—86a, thereby picking up 290 before 136a, 136b and 136c. Hence 290d, 290e and 290f points open to prevent reenergization of 143a, 143b and 143c, respectively. Also 290c points open to break previous stick circuit for operations of successive printing when this type of printing is being utilized. The closure of contacts 84a, 85a and 86a cause energization of the related shutter clutch magnets 136a, 136b and 136c (see Fig. 17b).

With the aforesaid shutter clutch magnets energized, two further duplicating and printing cycles ensue with two further exposures of duplicating data on the detail films. During such exposure, while the shutters operate in the master film printing section there is no actual printing made because such master printing station has no illumination at this time. Ultimately, after all duplicating printing has been completed, operations are terminated upon the opening of contacts 84b, 85b and 86b (see Figs. 17c, 31 and 31a). Such contacts upon opening break the stick circuits to their related relays 280, 281 and 282 whereupon further operations are terminated.

In addition to the previously described operations, it is also possible to pre-set the controls and the plugging of the machine so that the following operations (a), (b) and (c) may be concurrently effected. The (a) operation involves the printing from every frame of the master film to one detail film. The (b) operation involves the printing on another detail film when the control number which is set up for that film agrees with the control number of the master film. The (c) operation involves the printing of data derived from the master film upon a third detail film and for effecting a plurality of reproductions of the single master film frame upon such third detail film and such plurality of reproductions is effected upon a single agreement of a master film control number with a set up control number for such third detail film.

All of the foregoing operations (a), (b) and (c) may be effected with a single set of controlling set ups which may be maintained after once set. As a corollary to the foregoing operations (a), (b) and (c), provision is made whereby a modified operation (d) may be secured. Such (d) operation can be used in lieu of any one of the aforesaid mentioned operations (a), (b) or (c) and the other two of the foregoing operations may be maintained. The (d) operation involves the printing from the master film to one detail film for every frame except where the control number on the master film agrees with a set up control number for the detail film in which event printing on such related detail film would be suppressed for the particular master film frame bearing such corresponding control number.

In order to set up the machine to perform the foregoing supplemental operation (a), the following controls are established before the machine is put into operation.

Referring to Fig. 17a, a plug connection is established from 193 to 194. With this plug connection, relay 209 is energized upon every closure of cam contacts CC—7, whereupon printing will be effected on detail film 120a or detail A of data from every master film frame.

To set up the controls for the (b) operation, the following plugging connections are made. According to the size of the control number the proper plug connections are made from the proper columns of the 226 sockets to the 225 sockets. A plug connection is also made from 195 to the proper socket of the 227 sockets and a plug connection is made from 228 to 196. The desired control number is set up on the 64b setup device which is related to the B detail film (the 120b detail film). On agreement of the control number on the 64b setup device with the control number upon a master film frame the proper 224b contacts will become closed and upon closure of CC—7 relay coil 210 will be energized, whereby printing will be effected upon the B detail film of the master film data number.

To set up the machine controls for the (c) operation, mentioned above, the proper columnar order plugging will be made from sockets 216 and 218 to 215 and 217. The desired control number is set up on the 64c setup device and a plug connection is made from socket 197 to the proper 219 socket. Another plug connection is made from socket 220 to a socket 198. Plug connections are also made from socket 235 to 236 (Fig. 17b) and from 237 to 238 and from 239 to 240. Another connection is made from socket 241 to 242. On the 64Rc setup device there is a set up of the number of times that repetition of printing is desired on the C (120c) detail film. A further plug connection is made from socket 190 to socket 187 (Fig. 17b).

With the foregoing controls established upon a matching comparison of the control number on a master film frame with the set up control number on 64c (Fig. 17a) there will be an energization of 211 to bring about printing on the C detail film and such printing will be repeated a number of times, depending upon the set up on 74Rc (Fig. 17b).

Considering now the supplemental operation (d), mentioned above, which it will be recalled is a supplemental operation adapted to take the place of any one of the foregoing operations (a)

or (b) or (c) mentioned above, for supplemenal operations the controls which control the operation to be eliminated are removed and in lieu thereof the following control set up is established. If the substituted (d) operation is to take the place of the (a) operation aforementioned, the controls for the (d) operation will be made as follows: Plug connections will be made from the proper 230 sockets to the proper 229 sockets. A proper control number setting will be made on 64a. A plug connection will be made from 193 (Fig. 17a) to the proper 231 socket and from socket 232 a connection will be made to one of the 258 sockets. A plug connection will also be made from 261 to 194.

With the foregoing control set up there will be printing of data from the master film from every frame thereof to the detail film A (120a) for all frames except those of the master film containing a control number which matches the setting on 64a. Normal printing is brought about for every frame by the energization of relay coil 209, but when matching occurs between the master film control number and the set up control number, relay 264 becomes energized which causes opening of contacts 264b before the circuit can be completed to energize relay coil 209. If the (d) operation is to be used in lieu of the (b) operation the control set ups are as follows: From the proper 226 sockets to the proper 225 sockets. From socket 195 to the proper one of the 227 sockets. From 228 to 259 and from 262 to 196. With this set of controls established, energization of 210 will cause printing and energization of 265 will suppress printing. If the (d) operation is to be used in lieu of the (c) operation the proper connections will be made from 218—216 to 215—217 and from 197 to the proper 219 socket and from 220 to 260 and from 263 to 198. With this set up the energization of 211 will cause printing and the energization of 266 will suppress printing.

What I claim is:

1. A film printing machine with means for feeding a plurality of detail films, means for feeding a master film, means to trans-illuminate the master film, means to scan the master film for control data, set up means one for each detail film for control data, means to compare the scanned data with the set up data, and means controlled by said comparing means to cause a corresponding detail film to be exposed in the event of a comparison.

2. The invention according to claim 1, wherein means is provided controlled by the comparing means to cause a concurrent exposure of a plurality of detail films upon control data on the master film comparing to like control data upon a plurality of setup devices which are related to the detail films which receive such exposure.

3. A film printing machine with means for transilluminating a master film and for exposing a detail film with rays which pass through a master film frame, means to cause repeated exposures of matter derived from a single master film frame upon successive frames of a detail film, means to feed the detail film between each of the said exposures, means to optically scan the master film for differentially disposed spots representative of numerical control data, means to differentially set up desired numerical control data, differentially timed comparing means to compare said optically scanned control spots with the differentially set control data, means to initiate such repeated exposures only upon comparison of scanned control data and set up data, means settable for the number of repeated exposures desired, and means controlled thereby to terminate such repeat exposures when the number of exposures equals the initial setting.

4. A film printing machine with film feeding means for master and detail films, a plurality of setup devices one for each set up control number, means to optically sense the master film for control data thereon, means to compare the optically sensed data with the data set up upon the respective setup devices, means to trans-illuminate the master film, means controlled by the comparing means and effective when control data upon the master film matches the data upon a single setup device for causing a plurality of the detail films to be exposed to the light rays which pass through the master film including means whereby identical data derived from the master film is transferred selectively to the said plurality of detail films.

5. The invention set forth in claim 4 wherein means is provided controlled upon matching of control data from the master film with set up control data upon one device for causing a single detail film to be exposed and including means effective upon matching of film control data with data upon another setup device for causing two detail films to be exposed and including means effective upon matching of film control data with data on another setup device for causing three detail films to be exposed.

6. A film printing machine with means for feeding a master film and means for feeding a plurality of detail films, means for trans-illuminating the master film to provide light rays for exposing one or more of the detail films, means effective while film feed of the master and detail films is being suspended for concurrently exposing more than one detail film to light rays which pass through a single frame of a master film, said machine including control means normally tending to cause exposure of all detail films, a hand setup device for control data one for each detail film and for each control number, means to optically sense control data upon the master film, means to compare such sensed data with the set up control data, and means controlled by said comparing means in the event of matching of control data derived from the film with set up control data to suppress exposing of the detail film corresponding to the setup device which has data thereon matching the control data on the master film.

7. A film printing machine with means for feeding a master film and means for feeding a plurality of detail films, means for trans-illuminating the master film to provide light rays for exposing one or more of the detail films, means effective while film feed of the master and detail films is being suspended for concurrently exposing more than one detail film to light rays which pass through a single frame of a master film, said machine including control means normally tending to cause exposure of all detail films, a hand setup device for control data one for each detail film and for each control number, means to optically sense control data upon the master film, means to compare such sensed data with the set up control data, means controlled by said comparing means in the event of matching of control data derived from the film with set up control data to suppress exposing of the detail film corresponding to the setup device which has data thereon matching the control data on the master film and means controlled by said comparing means in the event of control data on the film matching control data on one setup device for suppressing exposure of the corresponding detail film, and means controlled by said comparing means in the event of control data from the film matching control data upon another setup device for suppressing the exposure of a plurality of detail films.

8. A film printing machine with means for feeding a master film and means for feeding a plurality of detail films, means for trans-illuminating the master film to provide light rays for exposing one or more of the detail films, means effective while film feed of the master and detail films is being suspended for concurrently exposing more than one detail film to light rays which pass through a single frame of a master film, said machine including control means normally tending to cause exposure of all detail films, hand setup means for control number data, means to optically sense control data upon the master film, means to compare such optically sensed control data with set up control data, and means controlled by said comparing means in the event of control data from the film matching control data upon a single set up means for suppressing the exposure of a plurality of films.

9. A film printing machine, including feeding means for a master film and a plurality of detail films, means to transilluminate the master film to provide light rays for detail film exposure, means to cause exposure of the detail films while detail and master film feed is suspended, a plurality of hand set up devices, one for each detail film, for supplemental data to be transferred to the detail films, said hand set up devices including a plurality of differentially settable members upon which different numerical data may be set with control spot means differentially positioned thereby to provide, when photographed, control spots differentially disposed upon the film according to the hand set up numerical data, and means to optically transfer such hand set up data from each hand set up control spot device to each related detail film.

10. A film printing machine with master and detail film feeding means, means for causing the reproducing of master film data upon the detail film, said detail films including a plurality of detail films and control means for said reproducing means to cause data from every frame of the master film to be reproduced on one detail film, and control means to cause printing upon a second film when control data upon a master film frame agrees with a set up control number for such detail film, said last mentioned control means including means to set up a control number, means to compare said control number with master film control data and means controlled thereby upon agreement to cause reproducing of the second detail film, control means for controlling reproducing upon a third detail film upon agreement of master film control data with a set up control number and for repeating such reproducing a plurality of times, said last mentioned control means including set up means for the control number, a number of times set up means, means to compare master film control data with set up control number data upon the set up means therefor, and means controlled by said comparing means to cause the reproducing means to effect printing on the third detail film, and means for also controlling the reproducing means from and by the number of times control.

11. The invention set forth in claim 10 wherein a substitute control is provided adapted for controlling reproducing upon any detail film in lieu of the corresponding control of the foregoing claim, said control including means to suppress reproducing upon matching of master film control data with set up control data for a selected film.

12. A film printing machine with means for feeding a master film and a plurality of detail films, means for selectively connecting and disconnecting the drive for the feed of the detail films, means to scan the master film for control data, means to transilluminate the master film to provide light rays for exposing one or another of the detail films and comparing means effective upon the scanning of a single frame of the master film for selecting which detail film is to be exposed and for selecting which detail film is to be fed while film feed of unexposed detail films is suppressed.

13. A film printing machine with means for feeding a plurality of detail films, means for feeding a master film, means to transilluminate the master film, means to scan the master film for control data, a plurality of setup means, one for each detail film for control data, means to compare control data scanned from a common flange of the master film concurrently with the control data upon all of the aforesaid setup means and means controlled by said comparing means to cause a corresponding detail film to be exposed in the event of a comparison.

14. A film printing machine with means for feeding a master film, means to selectively feed and expose any of a plurality of detail films, means to select which of the plurality of films is to be fed and exposed comprising set up devices for control data, one for each detail film, means to scan the master film for control data, means to compare scanned data with the data set up upon each of the setup devices and means controlled by said comparing means upon comparison of scanned control data with set up control data to control the selecting means for film feed and exposure so that the corresponding detail film will be feed and exposed.

15. A film printing machine with means for feeding a master film and a predetermined number of detail films, means to expose the detail film which is fed, means to transilluminate the master film to provide light rays for exposing a detail film, means to scan the master film for control data, and selecting means controlled by such scanning means to selectively control which detail film of the said predetermined number of films is to be fed and exposed, and means to suppress the feed of the remaining films which are not selected for exposure by the scanning means.

16. The invention according to claim 15 wherein the selecting means includes means selectively providing for the exposure of a said number of said predetermined number of detail films under scanning control.

17. A film printing machine with means for transilluminating a master film and for exposing a detail film with rays which pass through a master film frame, means to cause repeated exposure of matter derived from a single master film frame upon successive frames of a detail film, said last named means including means for scanning the master film for control data, which scanning means comprises a source of light rays and light responsive means controlled by the light rays modified by the control data, circuit control means to selectively set up comparison data, means controlled by the scanned means for comparing the scanned data and set up data and means controlled by the last mentioned means to bring about repeated exposure upon comparison of scanned data and set up comparison data.

18. A film printing machine with film feeding means for a master film and a predetermined number of detail films, means to transilluminate the master film to provide light rays for detail film exposure, means to scan the master film for control data and means controlled by said last named means to selectively feed and expose certain of the predetermined number of the detail films and to suppress film feed of the remaining detail films which are not to be exposed.

19. The invention according to claim 18 wherein the selecting means controlled by the scanning means includes means to cause more than one detail film to be fed and exposed.

20. The invention according to claim 18 wherein the selecting means includes differentially settable hand set means upon which desired numerical control data may be set up by differential settings thereof.

21. The invention according to claim 18 wherein the selecting means includes a plurality of hand setup devices, one for each detail film, each including differentially settable means upon which different settings of desired numerical control data may be set by differentially effected hand settings.

22. A film printing machine including a master film scanning station with means for scanning differentially disposed indicia representations on the master film, which by the differential disposition thereof are representative of different indicia representations, said scanning means comprising a source of light rays and light responsive means controlled by the light rays modified by the indicia representations, means for retaining selected predetermined indicia representations, means controlled by the scanning means for comparing the scanned representations and the said predetermined representations for determining the relationship thereof, a second film, and means for transferring the differentially disposed representations from the master film to the said second film upon determination of a predetermined relationship of the scanned and predetermined representations by the said comparing means.

23. A film printing machine including a master film scanning station with means for scanning differentially disposed indicia representations on the master film, which by the differential disposition thereof are representative of different indicia representations, said scanning means comprising a source of light rays and light responsive means controlled by the light rays modified by the indicia representations, means for retaining selected predetermined indicia representations, means controlled by the scanning means for comparing the scanned representations and the said predetermined representations for determining the relationship thereof, a plurality of detail films including film selecting means, and means controlled by the comparing means for rendering the film selecting means effective for selecting certain of the detail films from the said plurality upon determination of a predetermined relationship of the scanned and predetermined representations, and means for transferring the said scanned representations from the master film to the said selected detail films.

24. A film printing machine including a master film scanning station with means for scanning differentially disposed indicia spots on the master film, which by the differential disposition thereof are representative of different control data, said scanning means comprising a source of light rays and light responsive means controlled by the modification of the light rays by said indicia spots, means for storing selected predetermined indicia, means controlled by the light responsive means for comparing the scanned indicia and said predetermined indicia for determining the relationship thereof, a plurality of individual detail films, and means for transferring the scanned indicia to the said detail films including means for selectively transferring the scanned indicia to the individual films in accordance with the selected predetermined indicia and upon determination of a predetermined relationship between the scanned and said predetermined indicia by the comparing means.

25. A film printing machine including a master film scanning station with means for scanning the indicia disposed on the master film, a plurality of individual detail films and selectively settable control means for each detail film, and means for transferring the scanned data from the master film to the detail films including means for transferring the scanned data selectively to the individual detail films in accordance with the settings of the associated individual control means.

26. A film printing machine including a master film scanning station with means for scanning the indicia disposed on the master film, said scanning means comprising a source of light rays and light responsive means controlled by the light rays modified by the indicia, a circuit network including means for conditioning the network selectively for representing selected predetermined indicia, means controlled by the scanning means for comparing the scanned indicia and the said indicia retained by the conditioned circuit network for determining the relationship therebetween, a detail film, and means for transferring the scanned indicia to the detail film upon determination of a predetermined relationship between the scanned and predetermined indicia by the comparing means.

27. A film printing machine including a master film scanning station with means for scanning the representations disposed on the master film, a plurality of individual detail films, and means effective upon scanning predetermined representations disposed on the master film for causing transfer of the scanned representations to the said individual films including means for transferring selectively the scanned representations to the individual films in accordance with the representations scanned.

JAMES W. BRYCE.

CERTIFICATE OF CORRECTION.

Patent No. 2,172,330.  September 5, 1939.

JAMES W. BRYCE.

It is hereby certified that error appears in the printed specification of the above numbered patent requiring correction as follows: Page 16, second column, line 29, claim 13, for the word "flange" read frame; and that the said Letters Patent should be read with this correction therein that the same may conform to the record of the case in the Patent Office.

Signed and sealed this 12th day of December, A. D. 1939.

(Seal)

Henry Van Arsdale,
Acting Commissioner of Patents.